(12) United States Patent
Maruyama et al.

(10) Patent No.: US 12,191,761 B2
(45) Date of Patent: Jan. 7, 2025

(54) INTEGRATED CIRCUIT AND POWER SUPPLY CIRCUIT

(71) Applicant: FUJI ELECTRIC CO., LTD., Kawasaki (JP)

(72) Inventors: Hiroshi Maruyama, Matsumoto (JP); Takato Sugawara, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 804 days.

(21) Appl. No.: 17/458,704

(22) Filed: Aug. 27, 2021

(65) Prior Publication Data
US 2022/0166309 A1    May 26, 2022

(30) Foreign Application Priority Data
Nov. 26, 2020 (JP) ................. 2020-195998

(51) Int. Cl.
| | | |
|---|---|---|
| *H02M 1/42* | (2007.01) | |
| *H02M 1/00* | (2006.01) | |
| *H02M 1/08* | (2006.01) | |
| *H02M 3/158* | (2006.01) | |
| *H02M 3/335* | (2006.01) | |
| *H02M 7/217* | (2006.01) | |

(52) U.S. Cl.
CPC ....... *H02M 1/4225* (2013.01); *H02M 1/0022* (2021.05); *H02M 1/08* (2013.01); *H02M 3/158* (2013.01); *H02M 3/33507* (2013.01); *H02M 3/3353* (2013.01); *H02M 7/217* (2013.01)

(58) Field of Classification Search
CPC .... H02M 1/4225; H02M 1/0022; H02M 1/08; H02M 3/158
See application file for complete search history.

(56) References Cited

U.S. PATENT DOCUMENTS

| | | | |
|---|---|---|---|
| 7,554,367 B2 | 6/2009 | Chen et al. | |
| 2008/0116955 A1* | 5/2008 | Chen ...................... | H03K 17/26 327/434 |
| 2019/0334428 A1* | 10/2019 | Arima ............... | H02M 3/33507 |

* cited by examiner

*Primary Examiner* — Jue Zhang
*Assistant Examiner* — Afework S Demisse
(74) *Attorney, Agent, or Firm* — Rabin & Berdo, P.C.

(57) ABSTRACT

A signal output circuit including a first transistor coupled to a power supply line to receive a power supply voltage, a diode provided between the power supply line and a gate electrode of the first transistor, and a current generation circuit provided on a ground side with respect to the diode, the current generation circuit being configured to generate a current for the diode, upon turning on of the first transistor, and to increase the current, upon the power supply voltage dropping below a predetermined level.

19 Claims, 13 Drawing Sheets

| SIGNAL | IN = "H" AND en = "H" (TARGETED FOR Sup, Sdown) | | | | IN = "H" AND en = "L" | | IN="L" |
|---|---|---|---|---|---|---|---|
| | STATE 1 \|GATE Vg\| LARGE | STATE 2 \|GATE Vg\| MEDIUM | STATE 3 \|GATE Vg\| SMALL | NON-DRIVE STATE | STATE 4 \|GATE Vg\| LARGE | STATE 5 \|GATE Vg\| SMALL | |
| D0 | H | L | L | L | H | L | L |
| D1 | H | H | L | L | H | L | L |
| D2 | H | H | H | L | H | H | L |
| D3 | L | L | L | L | L | L | H |

FIG.7

INTEGRATED CIRCUIT AND POWER SUPPLY CIRCUIT

CROSS-REFERENCE TO RELATED APPLICATION

The present application claims priority pursuant to 35 U.S.C. § 119 from Japanese patent application number 2020-195998 filed on Nov. 26, 2020, the entire disclosure of which is hereby incorporated by reference herein.

BACKGROUND

Technical Field

The present disclosure relates to an integrated circuit and a power supply circuit.

Description of the Related Art

There are integrated circuits each configured to drive a power transistor to control an inductor current flowing through a transformer in an AC-DC converter (for example, U.S. Pat. No. 7,554,367).

A signal output circuit provided in such an integrated circuit may fail to operate appropriately when a power supply voltage fluctuates.

The present disclosure is directed to provision of a signal output circuit that outputs signals appropriately even when a power supply voltage fluctuates.

SUMMARY

An aspect of the present disclosure is a signal output circuit comprising: a first transistor coupled to a power supply line to receive a power supply voltage; a diode provided between the power supply line and a gate electrode of the first transistor; and a current generation circuit provided on a side of a ground with respect to the diode, the current generation circuit being configured to generate a current for the diode, upon turning on of the first transistor, and increase the current, upon the power supply voltage dropping below a first level.

Another aspect of the present disclosure is a power supply circuit configured to generate a direct-current voltage from an alternating-current voltage, the power supply circuit comprising: an inductor to receive a rectified voltage corresponding to the alternating-current voltage; a power transistor configured to control an inductor current flowing through the inductor; and an integrated circuit configured to drive the power transistor, the integrated circuit including a first transistor coupled to a power supply line to receive a power supply voltage, a diode provided between the power supply line and a gate electrode of the first transistor, and a current generation circuit provided on a side of a ground with respect to the diode, the current generation circuit being configured to generate a current for the diode, upon turning on of the first transistor, and increase the current, upon the power supply voltage dropping below a first level.

BRIEF DESCRIPTION OF THE DRAWINGS

FIG. 7 is a diagram illustrating logic levels of control signals D0 to D3 outputted from an adjustment circuit 81 in states.

DETAILED DESCRIPTION

At least following matters will become apparent from the descriptions of the present specification and the accompanying drawings.

Embodiments

<<<Overview of AC-DC Converter 10>>>

Figure 1:
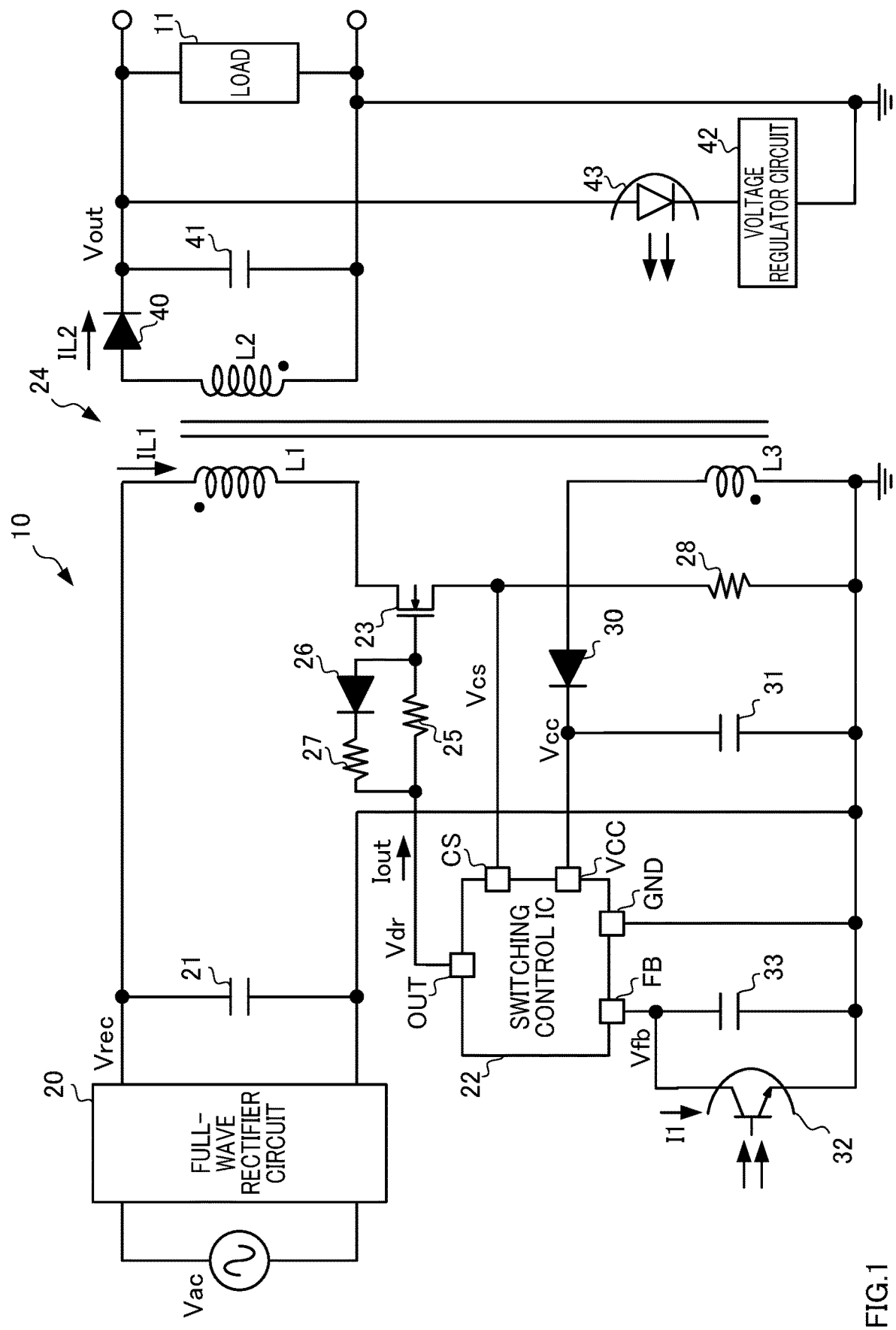
FIG. 1 is a diagram illustrating an example of an AC-DC converter 10.

FIG. 1 is a diagram illustrating an example of a configuration of an AC-DC converter 10 according to an embodiment of the present disclosure. The AC-DC converter 10 is a flyback power supply circuit that generates an output voltage Vout of a target level from an alternating current (AC) current Vac from a commercial power supply.

The AC-DC converter 10 comprises a full-wave rectifier circuit 20, capacitors 21, 31, 33, 41, a switching control IC 22, a power transistor 23, a transformer 24, resistors 25, 27, 28, diodes 26, 30, 40, a phototransistor 32, a voltage regulator circuit 42, and a light-emitting diode 43.

The full-wave rectifier circuit 20 full-wave rectifies an AC current Vac inputted thereto and outputs the rectified current, and the capacitor 21 smooths the output of the full-wave rectifier circuit 20, to generate a voltage Vrec.

The switching control IC 22 is an integrated circuit that controls the switching of the power transistor 23 such that the output voltage Vout will be at a target level.

The switching control IC 22 drives the power transistor 23 based on a current flowing through a primary coil L1 of the transformer 24 and the output voltage Vout. In an embodiment of the present disclosure, the resistors 25, 27 and the diode 26 are coupled between a terminal OUT of the switching control IC 22 and the gate electrode of the power transistor 23.

Alternatively, the terminal OUT and the power transistor 23 may be coupled to each other directly. The resistors 25, 27 and the diode 26 are elements that control the slope of the rise or fall of the gate voltage of the power transistor 23.

Note that the term "coupling" in an embodiment of the present disclosure includes not only direct coupling but also indirect coupling via a circuit element. Details of the switching control IC 22 will be described later.

The power transistor 23 is an NMOS transistor to control the power to a load 11 of the AC-DC converter 10, for example. Although the power transistor 23 is a metal oxide semiconductor (MOS) transistor in an embodiment of the present disclosure, the present disclosure is not limited thereto. The power transistor 23 may be another switching element such as a bipolar transistor or the like as long as it is a transistor capable of controlling power.

The resistor 28 is provided between the source electrode of the power transistor 23 and the ground to detect a current flowing through the primary coil L1 of the transformer 24 and the power transistor 23. The resistor 28 generates a voltage Vcs indicating the current value of a current flowing through the primary coil L1.

The transformer 24 includes the primary coil L1, a secondary coil L2, and an auxiliary coil L3, and the primary coil L1 and the auxiliary coil L3 are insulated from the secondary coil L2. In the transformer 24, a voltage is generated across each of the secondary coil L2 and the auxiliary coil L3 according to a change in the voltage across the primary coil L1.

The primary coil L1 according to an embodiment of the present disclosure has one end that receives the voltage Vrec and the other end that is coupled to the drain electrode of the power transistor 23. Accordingly, upon driving of the power transistor 23, a voltage is generated across each of the secondary coil L2 and the auxiliary coil L3.

The diode 30 rectifies a current from the auxiliary coil L3 of the transformer 24 and supplies the rectified current to the capacitor 31. Accordingly, upon driving of the power transistor 23, the capacitor 31 is charged with the current from the diode 30.

Although details are omitted here, the switching control IC 22 is activated based on the voltage Vrec, and after the activation, operates based on a voltage Vcc charged in the capacitor 31 (hereinafter referred to as a power supply voltage Vcc).

The diode 40 rectifies a current from the secondary coil L2 of the transformer 24 and supplies the rectified current to the capacitor 41. The capacitor 41 is charged with the current from the diode 40, and thus the output voltage Vout is generated across the capacitor 41. Note that in an embodiment of the present disclosure, the number of turns and the polarity of each of the primary coil L1 and the secondary coil L2 are determined such that the longer a period of time during which the power transistor 23 is on, the higher the output voltage Vout.

The voltage regulator circuit 42 generates a constant direct-current (DC) voltage and is configured with, for example, a shunt regulator.

The light-emitting diode 43 is an element that emits light having an intensity corresponding to the difference between the output voltage Vout and the output of the voltage regulator circuit 42, and configures a photocoupler together with the phototransistor 32 which will be described below. In an embodiment of the present disclosure, the higher the level of the output voltage Vout, the stronger the light emitted by the light-emitting diode 43.

The phototransistor 32 receives the light from the light-emitting diode 43 and passes a sink current I1 that increases with an increase in the intensity of light received.

The capacitor 33 is an element that, when the sink current I1 flows therethrough, stabilizes a voltage Vfb that is generated at a terminal FB of the switching control IC 22.

Note that the primary coil L1 corresponds to an "inductor," and the voltage Vrec corresponds to a "rectified voltage."

<<<Configuration of Switching Control IC 22>>>

Figure 2:
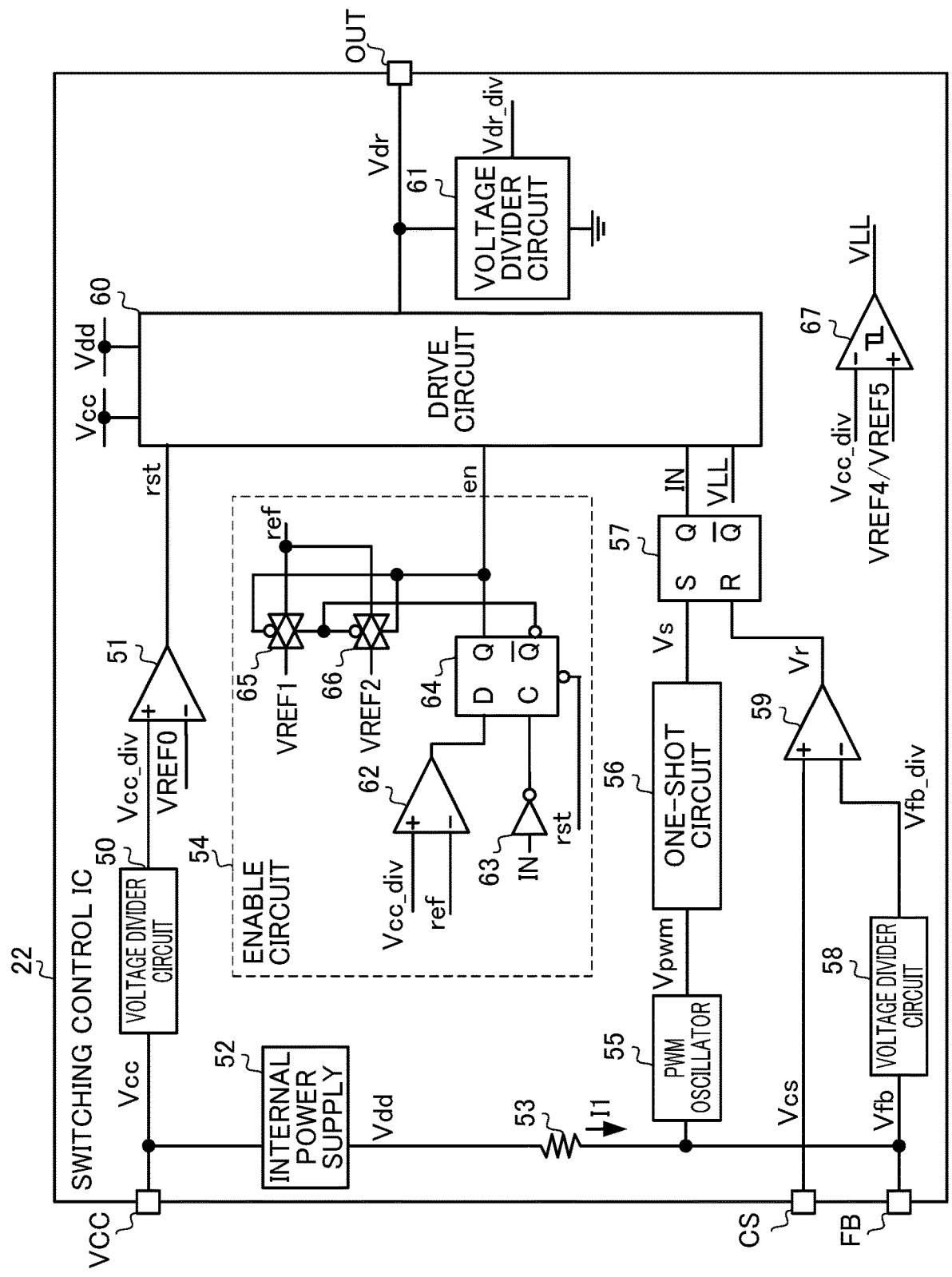
FIG. 2 is a diagram illustrating an example of a switching control IC 22.

FIG. 2 is a diagram illustrating an example of the switching control IC 22. The switching control IC 22 is an integrated circuit that controls the driving of the power transistor 23 and has terminals VCC, FB, CS, OUT. Note that a terminal GND is not illustrated for convenience sake.

The terminal VCC is a terminal that receives the power supply voltage Vcc generated from a current from the coil L3 corresponding to a change in an inductor current flowing through the coil L1.

The terminal FB is a terminal at which the voltage Vfb corresponding to the sink current I1 from the phototransistor 32 is generated.

The terminal CS is a terminal that receives the voltage Vcs generated with an inductor current IL1 flowing through the resistor 28 upon turning on of the power transistor 23.

The terminal OUT is a terminal from which a voltage Vdr for driving the power transistor 23 is outputted, and terminal OUT is coupled to the gate electrode of the power transistor 23 via the resistors 25, 27 and the diode 26.

The switching control IC 22 comprises voltage divider circuits 50, 58, 61, comparators 51, 59, an internal power supply 52, a resistor 53, an enable circuit 54, a PWM oscillator 55, a one-shot circuit 56, an SR flip-flop 57, a drive circuit 60, and a hysteresis comparator 67.

The voltage divider circuit 50 divides the power supply voltage Vcc into a tenth, for example, to generate a voltage Vcc_div.

The comparator 51 is a circuit that compares the voltage Vcc_div with a reference voltage VREF0 and outputs a reset signal rst. The reference voltage VREF0 is a voltage used to determine whether the power supply voltage Vcc has risen to the operation voltage of the switching control IC 22. In other words, the switching control IC 22 starts driving when the reset signal rst becomes high level (hereinafter referred to as high or high level).

Specifically, the circuits in the switching control IC 22 operate when the comparator 51 outputs a high signal rst, and are reset when the comparator 51 outputs a signal rst at low level (hereinafter referred to as low or low level).

The internal power supply 52 is a circuit that generates an internal voltage Vdd from the power supply voltage Vcc. The internal voltage Vdd is supplied to a control circuit 70, a second drive circuit 72, and the like which will be described later. The voltage Vfb is a voltage generated at the terminal FB with the sink current I1 of the phototransistor 32 flowing through the resistor 53 coupled between the internal voltage Vdd and the terminal FB.

When the output voltage Vout exceeds the target level, the light-emitting diode 43 emits light with higher intensity, thereby increasing the sink current I1 from the phototransistor 32. As a result, a current flowing through the resistor 53 increases, thereby lowering the voltage Vfb. In contrast, when the output voltage Vout drops below the target level, a current flowing through the resistor 53 decreases, thereby raising the voltage Vfb.

The enable circuit 54 generates a signal en to control the operation of the drive circuit 60 which will be described later based on the voltage Vcc_div at the falling edge of a signal IN. The enable circuit 54 comprises a comparator 62, an inverter 63, a D flip-flop 64, and transfer gates 65, 66.

The comparator 62 is a circuit that compares the voltage Vcc_div with a reference voltage ref. The reference voltage ref is one of a reference voltage VREF1 and a reference voltage VREF2 which is selected in response to the signal en.

The inverter 63 is an element that inverts the signal IN which will be described later and outputs the inverted signal as a clock for the D flip-flop 64.

The D flip-flop 64 receives the output of the comparator 62 at the rising edge of the clock and outputs a resultant as the Q output. The Q output of the D flip-flop 64 results in the signal en.

The transfer gates 65, 66 are circuits that output the reference voltage VREF1 or VREF2 as the reference voltage ref in response to the signal en. Specifically, the transfer gates 65, 66 output the reference voltage VREF1 as the reference voltage ref when the signal en is low, and outputs the reference voltage VREF2 as the reference voltage ref when the signal en is high.

As has been described above, when the voltage Vcc_div exceeds the reference voltage VREF1 and the signal en is high, and then the voltage Vcc_div at the falling edge of the signal IN drops below the reference voltage VREF2, the enable circuit 54 outputs the low signal en.

Meanwhile, when the voltage Vcc_div is lower than the reference voltage VREF2 and the signal en is low, and then the voltage Vcc_div at the falling edge of the signal IN exceeds the reference voltage VREF1, the enable circuit 54 outputs the high signal en. In cases other than these, the enable circuit 54 maintains the previous logic level of the signal en.

The PWM oscillator 55 is a circuit that outputs a signal Vpwm of PWM waveform with a switching frequency corresponding to the voltage Vfb.

The one-shot circuit 56 is a circuit that generates a one-shot pulse Vs at the rising edge of the signal Vpwm.

The SR flip-flop 57 receives the one-shot pulse Vs at its Set input, and a reset signal Vr which will be described later at its Reset input, and generates the signal IN. Thus, the SR flip-flop 57 generates the high signal IN upon the one-shot pulse Vs going high, and generates the low signal IN upon the reset signal Vr going high.

The voltage divider circuit 58 is a circuit that divides the voltage Vfb generated at the terminal FB, to generate a voltage Vfb_div.

The comparator 59 is a circuit that compares the voltage Vcs from the terminal CS with the voltage Vfb_div, to generate a reset signal Vr. Specifically, the comparator 59 outputs the low reset signal Vr when the voltage Vcs is lower than the voltage Vfb_div, and outputs the high reset signal Vr when the voltage Vcs exceeds the voltage Vfb_div.

The drive circuit 60 is a circuit that operates, upon the reset signal rst going high, such that a voltage Vdr for driving the power transistor 23 is outputted therefrom in response to the signal IN.

Specifically, when the signal en is high, the drive circuit 60 clamps the voltage Vdr to a predetermined level and outputs the clamped voltage Vdr in response to the high signal IN. When the signal en is low, the drive circuit 60 outputs the voltage Vdr at the voltage level of the power supply voltage Vcc in response to the high signal IN.

Meanwhile, when the signal IN is low, the drive circuit 60 outputs the voltage Vdr at the ground level. Details of the drive circuit 60 will be described later.

The voltage divider circuit 61 is a circuit that divides the voltage Vdr into a tenth, for example, to generate a voltage Vdr_div. The voltage divider circuit 61 outputs the voltage Vdr_div to the control circuit 70 and the second drive circuit 72 which will be described later.

The hysteresis comparator 67 is a circuit that detects that the power supply voltage Vcc has gone low.

Specifically, the hysteresis comparator 67 outputs a high signal VLL upon the voltage Vcc_div dropping below a reference voltage VREF5, and outputs a low signal VLL upon the voltage Vcc_div exceeding a reference voltage VREF4. Note that the reference voltage VREF5 is lower than the reference voltage VREF4.

The reference voltages VREF4, VREF5 are lower than the reference voltages VREF1, VREF2. The reference voltage VREF5 corresponds to a "first level," and the reference voltage VREF4 corresponds to a "second level."

The switching control IC 22 operates such that the AC-DC converter 10 will output an output voltage Vout at the target level. The following describes a case where the switching frequency of the power transistor 23 changes proportionally with the voltage Vfb which corresponds to the output voltage Vout.

First, in the case where the output voltage Vout exceeds the target level, the voltage Vfb drops, and the PWM oscillator 55 outputs a signal Vpwm with a lower switching frequency. As a result, the switching control IC 22 causes the power transistor 23 to be on for a shorter period of time, such that the AC-DC converter 10 lowers the output voltage Vout to the target level.

Next, in the case where the output voltage Vout is lower than the target level, the voltage Vfb rises, and the PWM oscillator 55 outputs a signal Vpwm with a higher switching frequency. As a result, the switching control IC 22 causes the power transistor 23 to be on for a longer period of time, such that the AC-DC converter 10 raises the output voltage Vout to the target level. Note that the hysteresis comparator 67 corresponds to a "first control circuit."

The following describes the operation of the switching control IC 22 when the AC-DC converter 10 operates continuously or discontinuously.

<<<Operation of AC-DC Converter 10 During Continuous Operation>>>

Figure 3:
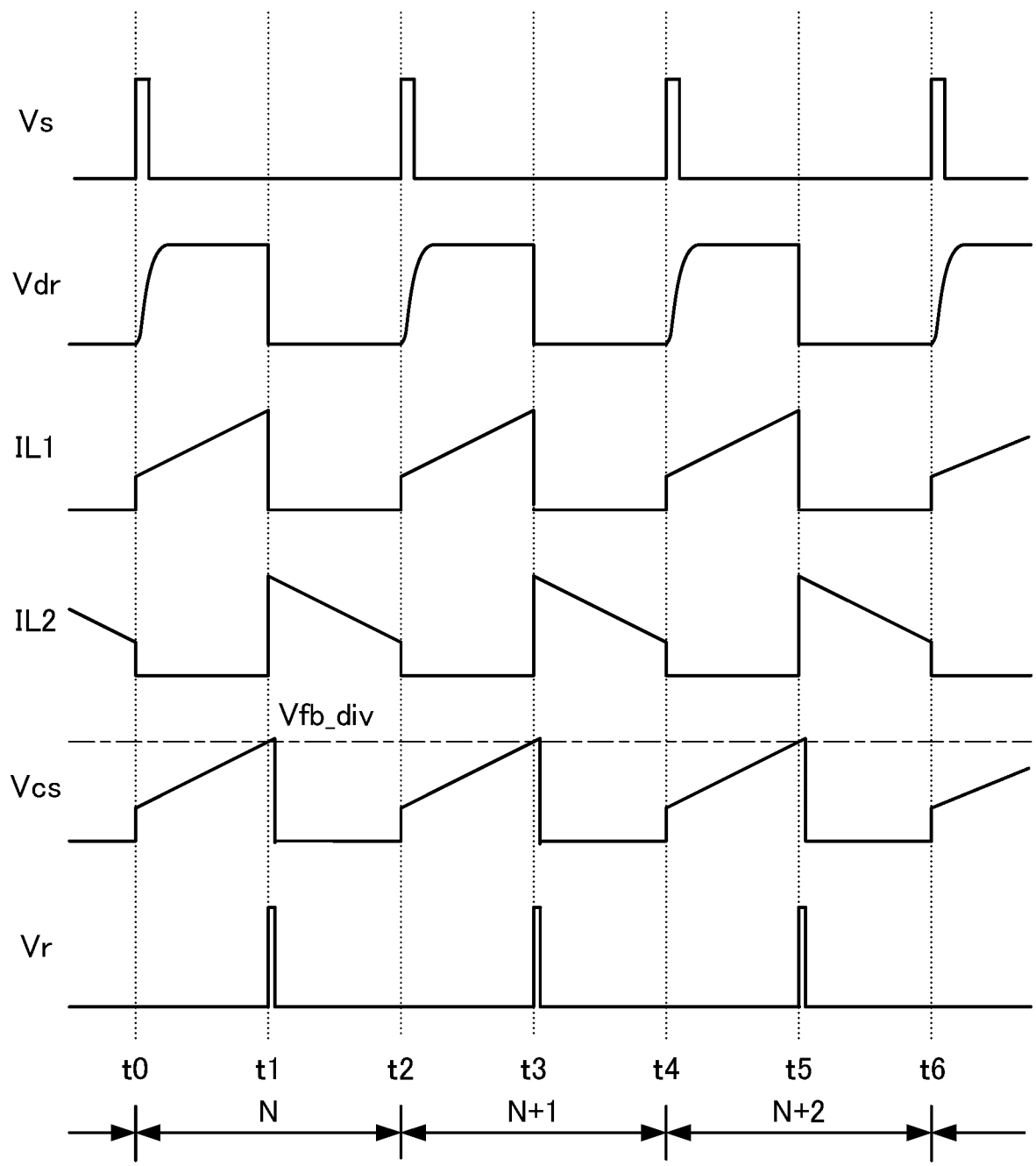
FIG. 3 is a diagram illustrating an example of the operation of an AC-DC converter 10 during continuous operation.

FIG. 3 is a diagram illustrating the operation of the switching control IC 22 when the AC-DC converter 10 is operated continuously. Note that the N-th period refers to a period of time from time t0 to time t2, the N+1-th period refers to a period of time from time t2 to time t4, and the N+2-th period refers to a period of time from time t4 to time t6. The following describes the N-th period first.

At time t0, the PWM oscillator 55 outputs a signal Vpwm with a switching frequency corresponding to a voltage Vfb. At the rising edge of the signal Vpwm, the one-shot circuit 56 outputs a signal Vs which is a high-level one-shot pulse.

Upon receiving the signal Vs which is a high-level one-shot pulse, the SR flip-flop 57 outputs a high signal IN. In response to this, the drive circuit 60 raises the voltage level of a signal Vdr and turns on the power transistor 23.

When the voltage level of the signal Vdr is raised and the power transistor 23 is turned on, the inductor current IL1 flowing through the primary coil L1 increases with a positive offset because the AC-DC converter 10 is continuously operating. Accordingly, the voltage Vcs that is generated with the inductor current IL1 flowing through the resistor 28 also increases with a positive offset similarly to the inductor current IL1.

Meanwhile, the secondary coil L2 is electromagnetically coupled with the opposite polarity. Because the diode 40 is off, an inductor current IL2 does not flow through the secondary coil L2 while the power transistor 23 is on, and thus energy is accumulated in the transformer 24.

Upon the voltage Vcs exceeding the voltage Vfb_div at time t1, the comparator 59 outputs a high signal Vr. Accordingly, the SR flip-flop 57 outputs the low signal IN, and the drive circuit 60 lowers the voltage level of the signal Vdr to turn off the power transistor 23.

When the voltage level of the signal Vdr drops and the power transistor 23 is turned off, the inductor current IL1 drastically decreases. Accordingly, energy accumulated in the transformer 24 is outputted from the secondary coil L2 via the diode 40. At this time, the inductor current IL2 flows while decreasing at a constant rate. Further, the inductor current IL2 has not reached zero yet right at the moment at which time t2 has been reached, and the inductor current IL2 becomes zero upon the power transistor 23 being turned on and the inductor current IL1 starting to flow.

From time t2 to time t6, the operation from time t0 to t2 is repeated. Accordingly, during the continuous operation, the AC-DC converter 10 operates without the inductor current IL1 reaching zero, while the power transistor 23 is on. During continuous operation, either one of the inductor current IL1 and the inductor current IL2 is flowing at any moment from time t0 to time t6.

<<<Operation of AC-DC Converter 10 During Discontinuous Operation>>>

Figure 4:
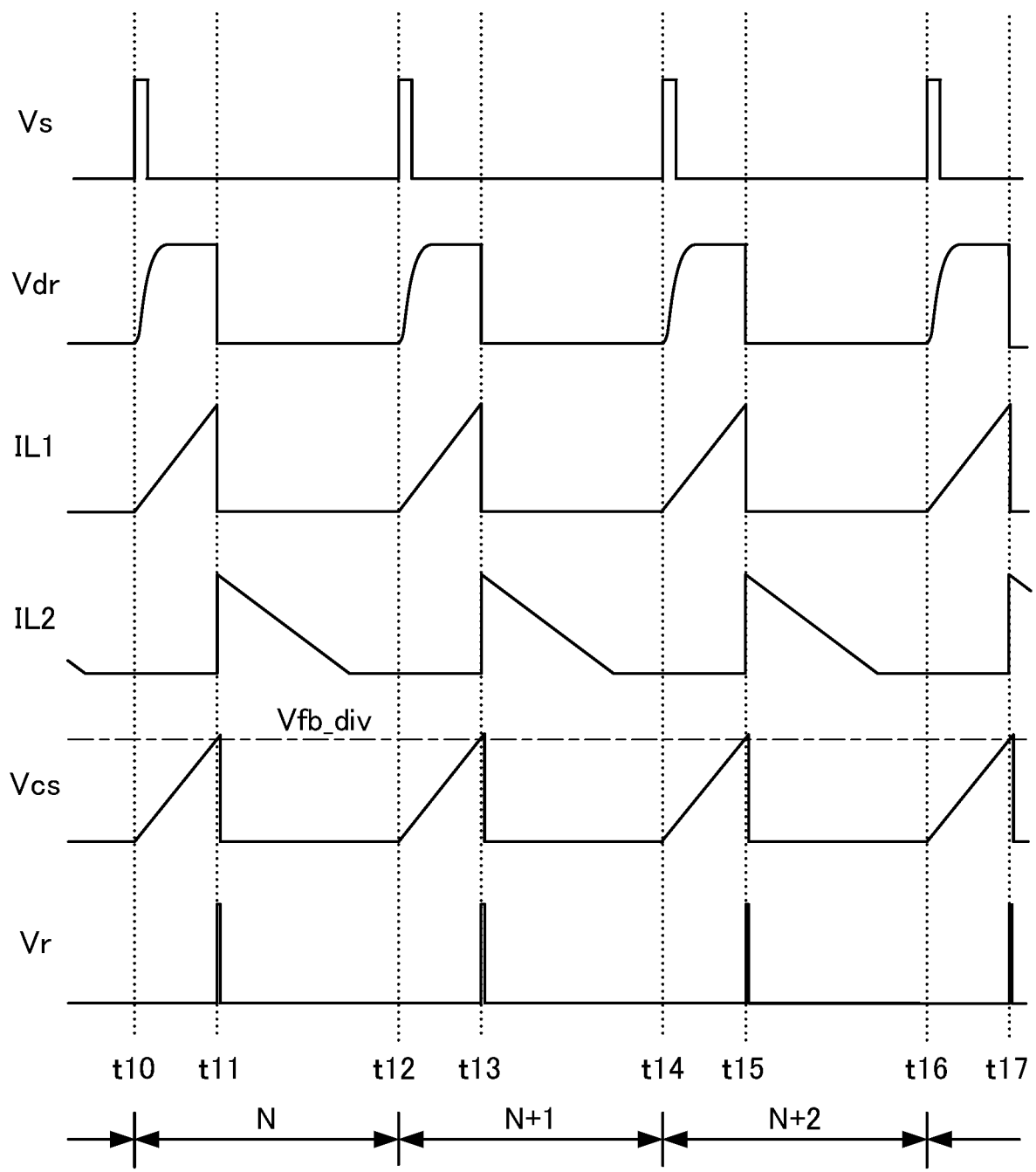
FIG. 4 is a diagram illustrating an example of the operation of an AC-DC converter 10 during discontinuous operation.

FIG. 4 is a diagram illustrating the operation of the switching control IC 22 when the AC-DC converter 10 is operated discontinuously. Note that the N-th period refers to a period of time from time t10 to time t12, the N+1-th period refers to a period of time from time t12 to time t14, and the N+2-th period refers to a period of time from time t14 to time t16. The following describes the N-th period first.

At time t10, the PWM oscillator 55 outputs the signal Vpwm with a switching frequency corresponding to the voltage Vfb. At the rising edge of the signal Vpwm, the one-shot circuit 56 outputs a signal Vs which is a high-level one-shot pulse.

Upon receiving the signal Vs which is a high-level one-shot pulse, the SR flip-flop 57 outputs a high signal IN. In response to this, the drive circuit 60 raises the voltage level of the signal Vdr to turn on the power transistor 23.

When the voltage level of the signal Vdr rises and the power transistor 23 is turned on, the inductor current IL1 flowing through the primary coil L1 increases without a positive offset because the AC-DC converter 10 is discontinuously operating. In other words, when the AC-DC converter 10 is discontinuously operating, the inductor current IL1 increases from a state in which the inductor current IL1 has flowed and is completely gone (i.e., from zero). Accordingly, the voltage Vcs that is generated with the inductor current IL1 flowing through the resistor 28 increases without a positive offset similarly to the inductor current IL1. In other words, the voltage Vcs also increases from zero.

Meanwhile, the secondary coil L2 is electromagnetically coupled with the opposite polarity. Because the diode 40 is off, the inductor current IL2 does not flow through the secondary coil L2 while the power transistor 23 is on, and energy is accumulated in the transformer 24.

Upon the voltage Vcs exceeding the voltage Vfb_div at time t11, the comparator 59 outputs a high signal Vr. Accordingly, the SR flip-flop 57 outputs the low signal IN, and the drive circuit 60 lowers the voltage level of the signal Vdr to turn off the power transistor 23.

When the voltage level of the signal Vdr drops and the power transistor 23 is turned off, the inductor current IL1 drastically decreases. Accordingly, energy accumulated in the transformer 24 is outputted from the secondary coil L2 via the diode 40. Note that when the power transistor 23 is turned on again at time t12 as at time t10, the inductor current IL2 is not flowing because the AC-DC converter 10 is operating discontinuously. The inductor current IL2 generated at time t11 decreases at a constant rate and reaches zero somewhere between time t11 and time t12.

From time t12 to time t17, the operation from time t10 to t12 is repeated. Accordingly, during the discontinuous operation, the AC-DC converter 10 operates such that the inductor current IL1 is zero, while the power transistor 23 is on. During the discontinuous operation, there are time periods during which neither the inductor current IL1 nor the inductor current IL2 is flowing, as in the period of time from time t11 to time t12, the period of time from time t13 to time t14, and the period of time from time t15 to time t16.

<<<Configuration of Drive Circuit 60>>>

Figure 5:
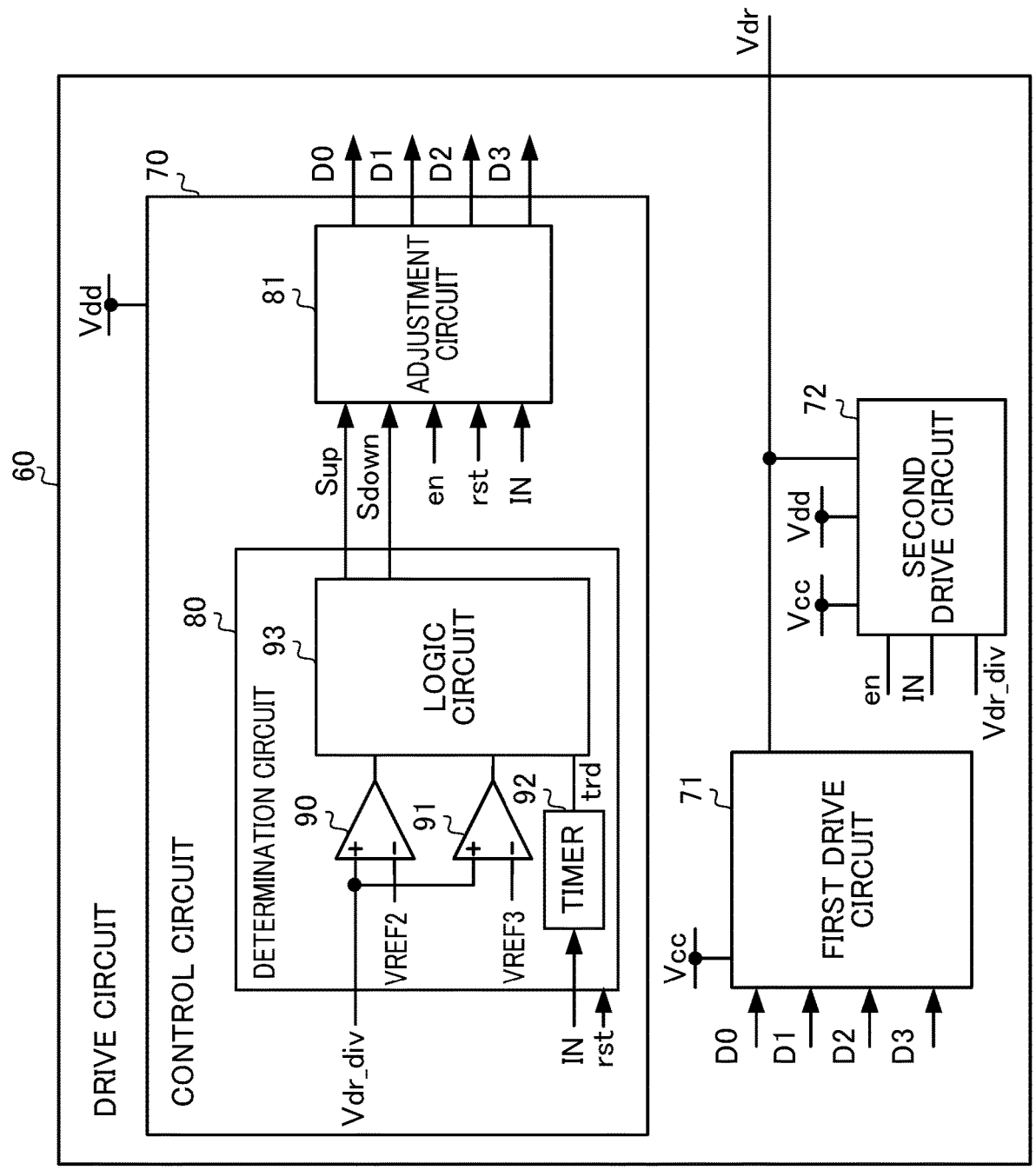
FIG. 5 is a diagram illustrating an example of a drive circuit 60.

FIG. 5 is a diagram illustrating an example of the drive circuit 60. The drive circuit 60 comprises the control circuit 70, a first drive circuit 71, and the second drive circuit 72.

The control circuit 70 is a circuit that determines a period of time during which the first drive circuit 71 drives the power transistor 23. The control circuit 70 outputs signals D0 to D3 to control the first drive circuit 71.

The first drive circuit 71 is a voltage-drive circuit that drives the power transistor 23 with a voltage in response to the signal D0 and the like from the control circuit 70.

The second drive circuit 72 is a current-drive circuit that drives the power transistor 23 with a current by supplying a current to the terminal OUT of the switching control IC 22 or receiving a current from the terminal OUT, in response to the voltage Vdr_div and the signals en, IN. Note that the details of the control circuit 70, the first drive circuit 71, and the second drive circuit 72 will be described below.

<<<Configuration of Control Circuit 70>>>

The control circuit 70 comprises a determination circuit 80 and an adjustment circuit 81, and outputs the signals D0 to D3 based on the voltage Vdr_div, the signal IN, and the reset signal rst.

Further, the control circuit 70 outputs the signal D0 and the like, based on the voltage Vdr_div, to control the first drive circuit 71 such that the voltage Vdr will fall within a predetermined range which will be described later.

The determination circuit 80 is a circuit that determines whether the voltage Vdr is within a predetermined range (i.e., whether the voltage Vdr_div falls in the range between the reference voltage VREF2 (e.g., 1.4 V) and a reference voltage VREF3 (e.g., 1.5 V)).

Specifically, if the voltage Vdr_div exceeds the reference voltage VREF3 consecutively while a timer 92 (described later) outputs a rising edge of a clock signal trd three times, the determination circuit 80 outputs a low signal Sup and a high signal Sdown to the adjustment circuit 81 which will be described later. Meanwhile, if the voltage Vdr_div drops below the reference voltage VREF2 consecutively while the timer 92 outputs a rising edge of a clock signal trd three times, the determination circuit 80 outputs a high signal Sup and a low signal Sdown to the adjustment circuit 81. In cases other than these, the determination circuit 80 outputs low signals Sup, Sdown.

The determination circuit 80 comprises comparators 90, 91, the timer 92, and a logic circuit 93, and controls signals generated by the adjustment circuit 81 which will be described.

The comparator 90 is a circuit that determines whether the voltage Vdr_div is higher than the reference voltage VREF2, and the comparator 91 is a circuit that determines whether the voltage Vdr_div is higher than the reference voltage VREF3.

The timer 92 is a circuit that outputs a clock signal trd to operate the determination circuit 80. When the signal IN goes high, the timer 92 outputs a high clock signal trd after a lapse of a predetermined period of time ta, and when the signal IN goes low, the timer 92 outputs a low clock signal trd. Note that the predetermined period of time to is shorter than the period of time during which the signal IN is high.

The logic circuit 93 holds the outputs of the comparators 90, 91 at the rising edge of the clock signal trd from the timer 92. The logic circuit 93 outputs a high signal Sup and a low signal Sdown if the voltage Vdr_div is lower than the reference voltage VREF2 consecutively while the clock signal trd rises three times. Meanwhile, the logic circuit 93 outputs a low signal Sup and a high signal Sdown if the voltage Vdr_div exceeds the reference voltage VREF3 consecutively while the clock signal trd rises three times. Further, the logic circuit 93 outputs low signals Sup, Sdown if the voltage Vdr_div is not lower than the reference voltage VREF2 or is not higher than the reference voltage VREF3 consecutively while the clock signal trd rises three times.

The adjustment circuit 81 outputs signals D0 to D3 to control the first drive circuit 71 in response to the signals Sup, Sdown and the signal en.

The adjustment circuit 81 increases a voltage drive period upon the signal Sup going high and decreases a voltage drive period upon the signal Sdown going high. The voltage drive period is a period of time during which the first drive circuit 71 drives the power transistor 23 with a voltage. The adjustment circuit 81 maintains the voltage drive period when the signals Sup, Sdown are both low.

Specifically, the adjustment circuit 81 adjusts a period of time during which the high control signals D0 to D2 are outputted, according to the length of the voltage drive period. The configuration and operation of the first drive circuit 71 will be described later. Note that the control circuit 70 corresponds to a "second control circuit."

<<<Configuration and Operation of First Drive Circuit 71 and Operation of Adjustment Circuit 81>>>

Figure 6:
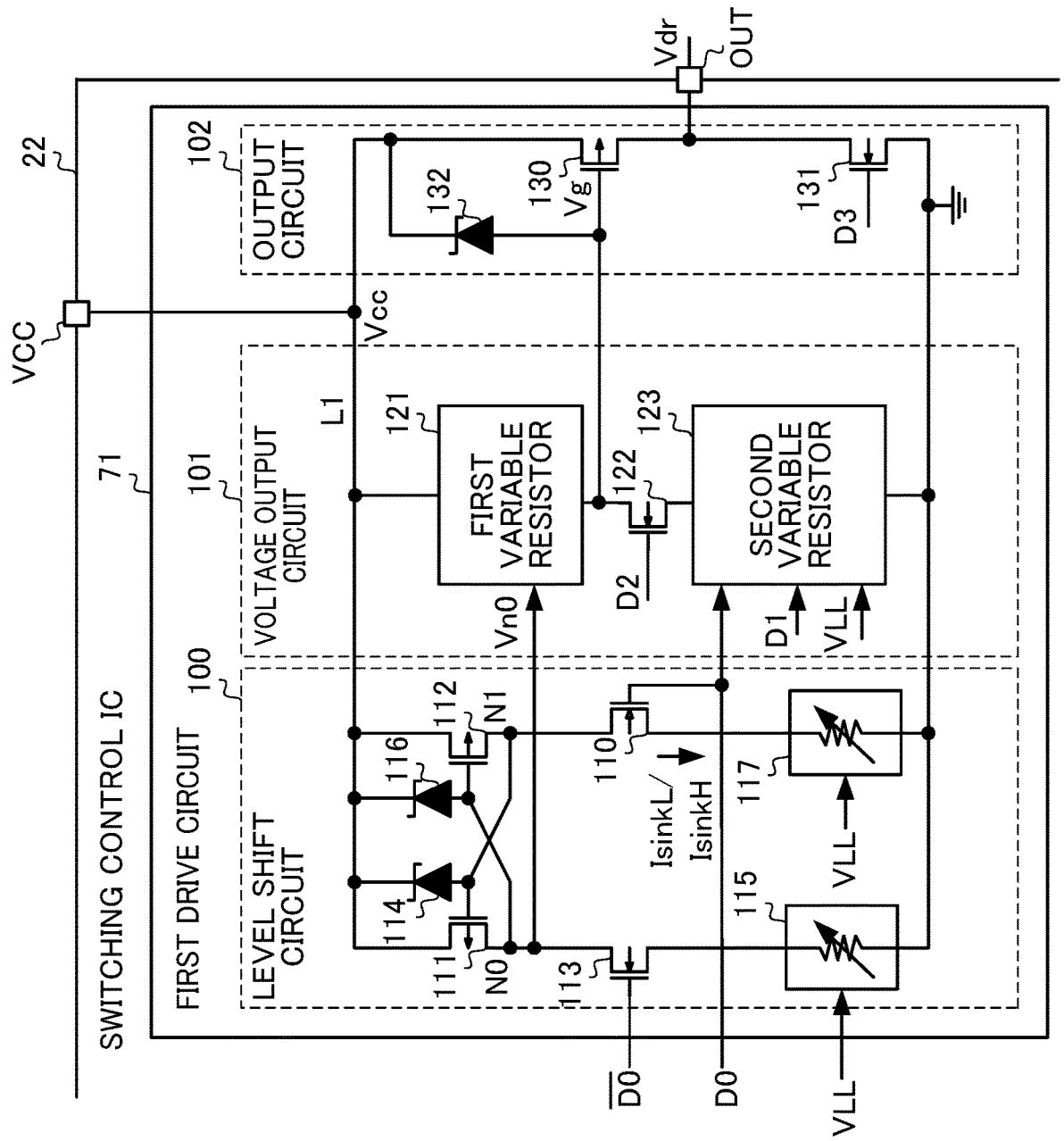
FIG. 6 is a diagram illustrating an example of a first drive circuit 71.

FIG. 6 is a diagram illustrating an example of the first drive circuit 71. The adjustment circuit 81 increases the period of time during which the control signals D0 to D2 are high, when the enable circuit 54 outputs a high signal en and the determination circuit 80 outputs a high signal Sup. Meanwhile, the adjustment circuit 81 decreases the period of time during which the control signals D0 to D2 are high, when the enable circuit 54 outputs a high signal en and the determination circuit 80 outputs a high signal Sdown. Note that a period of time during which at least any one of the control signals D0 to D2 is high corresponds to a voltage-drive period.

Further, when the enable circuit 54 outputs a high signal en and the SR flip-flop 57 outputs a high signal IN, the adjustment circuit 81 outputs the control signal D0 and the like to the first drive circuit 71, so as to sequentially undergo four states: a state 1, a state 2, a state 3, and a non-drive state. The logic levels of the control signals D0 to D3 in these states are as illustrated in FIG. 7 and will be described below.

As illustrated in FIG. 7, in the state 1, the adjustment circuit 81 causes the control signals D0 to D2 to be high and causes the control signal D3 to be low. In the state 2, the adjustment circuit 81 causes the control signal D0 to be low, the control signals D1 and D2 to high, and the control signal D3 to be low. In the state 3, the adjustment circuit 81 causes the control signals D0 and D1 to be low, the control signal D2 to be high, and the control signal D3 to be low. In the non-drive state, the adjustment circuit 81 causes the control signals D0 to D2 to be low and the control signal D3 to be low.

Meanwhile, as illustrated in FIG. 7, when the enable circuit 54 outputs a low signal en and the SR flip-flop 57 outputs a high signal IN, the adjustment circuit 81 outputs the control signal D0 and the like to the first drive circuit 71, so as to sequentially undergo two states: a state 4 and a state 5. The logic levels of the control signals D0 and the like in the state 4 are the same as those in the state 1, and the logic levels of the control signals D0 and the like in the state 5 are the same as those in the state 3.

Also, as illustrated in FIG. 7, when the SR flip-flop 57 outputs a low signal IN, the logic levels of the control signals D0 to D3 are such that the control signals D0 to D2 are low and the control signal D3 is high, irrespective of the logic level of the signal en.

The first drive circuit 71 is a circuit that drives the power transistor 23 with a voltage, and comprises a level shift circuit 100, a voltage output circuit 101, and an output circuit 102.

The level shift circuit 100 is a circuit that converts the control signal D0 for operating with the voltage Vdd into a signal Vn0 for operating with the power supply voltage Vcc. The level shift circuit 100 comprises N-channel metal-oxide-semiconductor (NMOS) transistors 110, 113, P-channel metal-oxide-semiconductor (PMOS) transistors 111, 112, variable resistors 115, 117, and Zener diodes 114, 116.

In other words, the level shift circuit 100 outputs the signal Vn0 of the logic level of the control signal D0. Specifically, the level shift circuit 100 outputs the high signal Vn0 upon the control circuit 70 outputting the high control signal D0, and outputs the low signal Vn0 upon the control circuit 70 outputting the low control signal D0.

The PMOS transistor 111 is coupled to a power supply line L1 that receives the power supply voltage Vcc. The Zener diode 114 has a cathode coupled to the power supply line L1 and an anode coupled to the gate electrode of the PMOS transistor 111. The NMOS transistor 110 is provided between the gate electrode of the PMOS transistor 111 and the variable resistor 117, and the variable resistor 117 is grounded.

Further, the NMOS transistor 110 is turned on upon the control circuit 70 outputting the high control signal D0. Then, a pull-down current corresponding to the resistance value of the variable resistor 117 flows through the NMOS transistor 110 and the Zener diode 114. The current value of a pull-down current in the case where the voltage Vcc_div is higher than the reference voltage VREF4 and thus the hysteresis comparator 67 outputs a low signal VLL is referred to as a current value IsinkL.

The Zener diode 114 operates such that, when a current increases, a clamping voltage, in other words, the gate-source voltage Vgs of the PMOS transistor 111, will increase.

When the current value IsinkL is sufficiently large and the PMOS transistor 111 is turned on based on the voltage Vgs, a voltage at a node N0 becomes substantially equal to the power supply voltage Vcc. Then, the level shift circuit 100 outputs the high signal Vn0.

Meanwhile, when the voltage Vcc_div is lower than the reference voltage VREF5, in other words, when the hysteresis comparator 67 outputs a high signal VLL, this means that the power supply voltage Vcc is low. Then, when the NMOS transistor 110 is turned on, a pull-down current corresponding to the resistance value of the variable resistor 117 flows through the NMOS transistor 110 and the Zener diode 114, similarly to the case where the signal VLL is low. Here, the current value of a pull-down current when the signal VLL is high is referred to as a current value IsinkH.

Further, if the resistance value of the variable resistor 117 were constant irrespective of the logic level of the signal VLL, the current value IsinkH would be smaller than the current value IsinkL because the power supply voltage Vcc is low. Accordingly, the voltage across the Zener diode 114 would also be small, which may cause the on-resistance of the PMOS transistor 111 to decrease insufficiently. In such a case, the level shift circuit 100 would fail to output the signal Vn0 appropriately.

Here, the current value IsinkH of the pull-down current needs to be increased when the power supply voltage Vcc is low, in order for the Zener diode 114 to increase the voltage Vgs, so as to enable the level shift circuit 100 to output the signal Vn0 appropriately. This also leads to that, if the resistance value of the variable resistor 117 were constant irrespective of the power supply voltage Vcc, a pull-down current IsinkL that flows when the power supply voltage Vcc is high increases as well.

Further, when the pull-down current is large and the dynamic resistance of the Zener diode 114 is large, the voltage Vgs may exceed the gate-source withstand voltage of the PMOS transistor 111. Thus, the dynamic resistance of the Zener diode 114 needs to be reduced by increasing the size of the Zener diode 114. However, an increase in size of the Zener diode 114 increases the circuit area of the integrated circuit.

Thus, the hysteresis comparator 67 outputs a high signal VLL upon the voltage Vcc_div dropping below the reference voltage VREF5, to control the variable resistor 117 such that the resistance value of the variable resistor 117 decreases. Meanwhile, the hysteresis comparator 67 outputs a low signal VLL upon the voltage Vcc_div exceeding the reference voltage VREF4, to control the variable resistor 117 such that the resistance value of the variable resistor 117 increases. In other words, the resistance value of the variable resistor 117 through which a pull-down current flows upon turning on the PMOS transistor 111 decreases upon the voltage Vcc_div dropping below the reference voltage VREF5.

Accordingly, when the signal VLL is high, the variable resistor 117 is controlled to have a resistance value smaller than that when the signal VLL is low, thereby increasing the current value IsinkH of a pull-down current. This causes the Zener diode 114 to increase the voltage Vgs such that the PMOS transistor 111 can be turned on and operate appropriately.

As a result, even if the power supply voltage Vcc is low, the level shift circuit 100 can output the signal Vn0 appropriately, without increasing the size of the Zener diode 114 to decrease the dynamic resistance of the Zener diode 114.

The coupling among the PMOS transistor 112, the NMOS transistor 113, the variable resistor 115, and the Zener diode 116 is similar to the coupling among the PMOS transistor 111, the NMOS transistor 110, the variable resistor 117, and the Zener diode 114.

Note that the NMOS transistor 113 that is turned on and off complementarily to the PMOS transistor 111 is provided on the ground side with respect to the PMOS transistor 111. Further, the NMOS transistor 110 that is turned on and off complementarily to the PMOS transistor 112 is provided on the ground side with respect to the PMOS transistor 112. Accordingly, the PMOS transistor 111 and the NMOS transistor 113 operate in the same manner as an inverter element, and can output, for example, the signal Vn0 appropriately even if the switching speed of the control signal D0 is high.

Further, when the control circuit 70 outputs the low control signal D0, the PMOS transistor 112, the NMOS transistor 113, the variable resistor 115, and the Zener diode 116 operate in the same manner as described above.

The PMOS transistors 111, 112 each correspond to a "first transistor," and the Zener diodes 114, 116 each correspond to a "diode." The NMOS transistor 110 and the variable resistor 117, or the NMOS transistor 113 and the variable resistor 115, correspond to a "current generation circuit." The NMOS transistor 110 corresponds to a "second transistor" when the PMOS transistor 111 is the first transistor, and corresponds to a "third transistor" otherwise. Similarly, the NMOS transistor 113 corresponds to the "second transistor" when the PMOS transistor 112 is the first transistor, and corresponds to the "third transistor" otherwise.

In addition, a circuit configured with the PMOS transistor 111, the Zener diode 114, the NMOS transistor 110, and the variable resistor 117 corresponds to a "signal output circuit." Similarly, a circuit configured with the PMOS transistor 112, the Zener diode 116, the NMOS transistor 113, and the variable resistor 115 also corresponds to the "signal output circuit."

The voltage output circuit 101 is a circuit that controls the gate voltage Vg of a PMOS transistor 130 (described later) in the output circuit 102 in response to the control signals D0 to D2 and the signal Vn0. The voltage output circuit 101 comprises a first variable resistor 121, an NMOS transistor 122, and a second variable resistor 123. Note that the second variable resistor 123 corresponds to a "variable resistor."

The first variable resistor 121 is a circuit that changes its resistance value in response to the signal Vn0, and the second variable resistor 123 is a circuit that changes its resistance value in response to the control signals D0 and D1 and the signal VLL to limit a current to flow through a Zener diode 132 (described later). The second variable resistor 123 is coupled to the first variable resistor via the NMOS transistor 122 in the states 1 to 3 in which the control signal D2 is high. Note that the NMOS transistor 122 corresponds to the "second transistor."

Specifically, in the state 1, the first variable resistor 121 and the second variable resistor 123 generate the minimum gate voltage Vg of the PMOS transistor 130, to maximize the driving capability of the PMOS transistor 130. Then, the gate voltage Vg is increased as the state transitions from the state 2 to the state 3, to lower the driving capability of the PMOS transistor 130. Then in the non-drive state, the gate voltage Vg equal to the voltage Vcc is applied to the PMOS transistor 130 to stop the PMOS transistor 130 driving the terminal OUT. Note that the operations in the states 4 and 5 are the same as the operations in the states 1 and 3, respectively.

The output circuit 102 is a circuit in which the PMOS transistor 130 applied with the gate voltage Vg drives the terminal OUT with a voltage, and comprises the PMOS transistor 130, an NMOS transistor 131, and the Zener diode 132. Note that the NMOS transistor 131 that is turned on and off complementarily to the PMOS transistor 130 is provided on the ground side with respect to the PMOS transistor 130.

As is apparent from FIG. 6, the coupling among the PMOS transistor 130, the Zener diode 132, the NMOS transistor 122, and the second variable resistor 123 is similar to the coupling among the PMOS transistor 111, the Zener diode 114, the NMOS transistor 110, and the variable resistor 117.

Accordingly, the operation described in the level shift circuit 100 is performed also in the PMOS transistor 130, the Zener diode 132, the NMOS transistor 122, and the second variable resistor 123.

Thus, as in the case where the resistance value of the variable resistor 117 changes in response to the signal VLL, the resistance value of the second variable resistor 123 changes not only in response to the control signals D0, D1, but also in response to the signal VLL. Specifically, the resistance value that changes in response to the control signals D0, D1, of the second variable resistor 123 through which a pull-down current flows when turning on the PMOS transistor 130, decreases when the voltage Vcc_div is lower than the reference voltage VREF5.

Further, in the operation of the first drive circuit 71 when the signal IN is high and the signal en is high, which will be described later, the voltage Vcc_div is higher than the reference voltage VREF4 and the signal VLL is low. Thus, the resistance value of the second variable resistor 123 changes only in response to the control signals D0, D1.

Meanwhile, in the operation of the first drive circuit 71 when the signal IN is high and the signal en is low, which will be described later, upon the voltage Vcc_div dropping below the reference voltage VREF5, the hysteresis comparator 67 outputs the high signal VLL.

In this case, the resistance value of the second variable resistor 123 changes in the same manner as the resistance value changes in response to the control signals D0, D1 when the signal VLL is low. However, the resistance value of the second variable resistor 123 when the signal VLL is high is lower than that when the signal VLL is low.

Accordingly, when the power supply voltage Vcc drops and the signal VLL is high, the driving capability of the PMOS transistor 130 exceeds the driving capability thereof when the signal VLL is low. Thus, the PMOS transistor 130 can appropriately output a signal for driving the power transistor 23 even when the power supply voltage Vcc is low. Note that the PMOS transistor 130 corresponds to the "first transistor," the Zener diode 132 corresponds to the "diode," and the NMOS transistor 122 and the second variable resistor 123 correspond to the "current generation circuit." The second variable resistor 123 corresponds to the "variable resistor." A connection point at which the PMOS transistor 130 and the NMOS transistor 131 are coupled to each other corresponds to an "output terminal." In addition, a circuit configured with the PMOS transistor 130, the Zener diode 132, the NMOS transistor 131, and the second variable resistor 123 corresponds to the "signal output circuit."

<<<Operation of First Drive Circuit 71 when Signal IN is High and the Signal En is High>>>

When the signal IN is high and the signal en is high, the first drive circuit 71 operates to undergo four states: the state 1, the state 2, the state 3, and the non-drive state. Note that, in this case, the hysteresis comparator 67 outputs the low signal VLL because the voltage Vcc_div is higher than the reference voltage VREF4. Thus, in this case, there is no need to consider decrease in the resistance value of the second variable resistor 123 in response to the signal VLL.

In the configuration described above, when the enable circuit 54 outputs a high signal en, the first drive circuit 71 lowers the driving capability of the PMOS transistor 130 in stages and increases the on-resistance of the PMOS transistor 130 in stages, with an increase in the gate voltage Vg as the state transitions from the state 1 to the non-drive state. Here, the "driving capability" indicates how much current the PMOS transistor 130 is capable of outputting to the terminal OUT.

Specifically, in the state 1, the first drive circuit 71 applies the minimum gate voltage Vg to the PMOS transistor 130, to provide the maximum driving capability of the PMOS transistor 130 and minimize the on-resistance of the PMOS transistor 130.

Then, in the state 2, the first drive circuit 71 applies the gate voltage Vg that is higher than that in the state 1 to the PMOS transistor 130, to provide the driving capability of the PMOS transistor 130 lower than that in the state 1, and increase the on-resistance of the PMOS transistor 130 thereby being larger than that in the state 1.

Then in the state 3, the first drive circuit 71 applies the gate voltage Vg that is higher than that in the state 2 to the PMOS transistor 130, to provide the driving capability of the PMOS transistor 130 lower than that in the state 2, and increase the on-resistance of the PMOS transistor 130 thereby being larger than that in the state 2.

Lastly, in the non-drive state, the first drive circuit 71 applies the gate voltage Vg that is equal to the power supply voltage Vcc to the PMOS transistor 130, to turn off the PMOS transistor 130 and maximize the on-resistance of the PMOS transistor 130.

The following describes a specific description of the operation of the first drive circuit 71 in each of the state 1 to the non-drive state and how the gate voltage Vg changes.

<<<<Operation of First Drive Circuit in State 1>>>>

In the state 1, the control circuit 70 causes the control signals D0 to D2 to be high and the control signal D3 to be low.

Thus, when the control circuit 70 outputs the high control signal D0, the level shift circuit 100 in the state 1 operates such that the NMOS transistor 110 is turned on and the logic level at a node N1 is low. Then, the PMOS transistor 111 is turned on, and the node N0 goes high. As a result, the PMOS transistor 112 is turned off, and the level shift circuit 100 outputs the high signal Vn0.

The Zener diode 114 is coupled between the gate and source of the PMOS transistor 111 as a clamping element. The Zener diode 114 is a circuit that protects the PMOS transistor 111 to restrain an excessive voltage from being applied between the gate and source of the PMOS transistor 111 when the PMOS transistor 111 is turned on.

However, when the PMOS transistor 111 is turned on, a difference in potential between the power supply voltage Vcc and the lowered potential at the node N1 is applied across the Zener diode 114. As a result, the current flowing through the Zener diode 114 increases, such that a voltage to be clamped by the Zener diode 114 becomes excessive, and the gate-source voltage of the PMOS transistor 111 may exceed the withstand voltage of the PMOS transistor 111.

To restrain the gate-source voltage of the PMOS transistor 111 from exceeding the withstand voltage thereof, the current flowing through the Zener diode 114 is limited by a resistance value Rs.

When the level shift circuit 100 outputs the high signal Vn0, the first variable resistor 121 raises the gate voltage Vg of the PMOS transistor 130 to the voltage Vcc. However, since the NMOS transistor 122 has been turned on in response to the high control signal D2, the second variable resistor 123 is coupled to the first variable resistor 121. Thus, the gate voltage Vg of the PMOS transistor 130 results in a minimum voltage generated based on the voltage Vcc by the first variable resistor 121, the second variable resistor 123, and the Zener diode 132.

In this case, when the resistance value of the second variable resistor 123 is R2a, the potential at the source electrode of the NMOS transistor 122 is 5V−Vgs, because the high signal D2 (i.e., the signal D2 of 5 V) is inputted to the gate electrode of the NMOS transistor 122. Here, Vgs is the gate-source voltage of the NMOS transistor 122.

The potential at the source electrode of the NMOS transistor 122 does not change even if the power supply voltage Vcc changes. Thus, a current Ids122a flowing through the NMOS transistor 122 also does not change, and the current Ids122a results in a current to pull down the gate electrode of the PMOS transistor 130. Also, the impedance between the power supply voltage Vcc and the gate electrode of the PMOS transistor 130 is the resultant resistance of the resistance value of the Zener diode 132 and a resistance value R1a (which is the resistance value of the first variable resistor 121) coupled in parallel.

Thus, the gate voltage Vg of the PMOS transistor 130 is given as a following expression:

$$Vg = Vcc - (Vz + Rz \times Ids122a)/(1 + Rz/R1a) \qquad (1)$$

where Vz is a voltage at the Zener diode 132 upon a current starting to flow, Rz is the dynamic resistance of the Zener diode 132, and the current Ids122a is a pull-down current of the gate electrode of the PMOS transistor 130 (i.e., a drain-source current of the NMOS transistor 122) in the state 1.

The output circuit 102 applies the gate voltage Vg outputted from the voltage output circuit 101 to the PMOS transistor 130, and generates a voltage Vdr. Note that the NMOS transistor 131 is off because the control signal D3 is low.

<<<<Operation of First Drive Circuit in State 2>>>>

In the state 2, the control circuit 70 causes the control signal D0 to be low, the control signals D1 and D2 to be high, and the control signal D3 to be low.

Thus, when the control circuit 70 outputs the low control signal D0, the level shift circuit 100 in the state 2 operates such that the NMOS transistor 113 is turned on and the logic level at the node N0 is low. Then, similarly to the level shift circuit 100 in the state 1, the PMOS transistor 112 is turned on, and the level shift circuit 100 outputs the low signal Vn0.

Then, while the control signal D0 from the control circuit 70 is low in the state 2, a current flowing through the Zener diode 116 is limited by the resistance value Rs.

When the level shift circuit 100 outputs the low signal Vn0, the first variable resistor 121 raises the gate voltage Vg of the PMOS transistor 130 to the voltage Vcc. However, since the NMOS transistor 122 has been turned on in response to the high control signal D2, the second variable resistor 123 is coupled to the first variable resistor 121. Thus, the gate voltage Vg of the PMOS transistor 130 results in a voltage generated, based on the voltage Vcc, by the first variable resistor 121, the second variable resistor 123, and the Zener diode 132. The gate voltage Vg in this case is higher than the gate voltage Vg in the state 1.

At this time, since the Zener diode 132 and the first variable resistor 121 (the resistance value of the first variable resistor 121 is referred to as R1b) are coupled in parallel, the impedance between the voltage Vcc and the gate electrode of the PMOS transistor 130 is the resultant resistance of the resistance value of the Zener diode 132 and the resistance value R1b. Note that the resistance value R1b is smaller than the resistance value R1a.

The resistance value of the second variable resistor 123 is R2b, and a current Ids122b at this time is smaller than the current Ids122a. Note that the resistance value R2b is larger than the resistance value R2a.

Here, the current Ids122b is (5V−Vgs2)/R2b. Since the current Ids122b flowing through the NMOS transistor 122 is smaller than the current Ids122a in the state 1, the voltage Vgs2 is slightly smaller than the voltage Vgs in the state 1.

Thus, the gate voltage Vg of the PMOS transistor 130 is given by the following expression:

$$Vg = Vcc - (Vz + Rz \times Ids122b)/(1 + Rz/R1b) \qquad (2)$$

where Vz is a voltage at the Zener diode 132 upon a current starting to flow, Rz is the dynamic resistance of the Zener diode 132 when a current flows through the Zener diode 132, and the current Ids122b is a pull-down current of the gate electrode of the PMOS transistor 130 (i.e., a drain-source current of the NMOS transistor 122) in the state 2.

The output circuit 102 applies the gate voltage Vg outputted from the voltage output circuit 101 to the PMOS transistor 130, and generates a voltage Vdr. Note that the NMOS transistor 131 is off because the control signal D3 is low.

<<<<Operation of First Drive Circuit in State 3>>>>

In the state 3, the control circuit 70 causes the control signals D0 and D1 to be low, the control signal D2 to be high, and the control signal D3 to be low.

Thus, when the control circuit 70 outputs the low control signal D0, the level shift circuit 100 in the state 3 outputs the low signal Vn0, as in the state 2.

When the level shift circuit 100 outputs the low signal Vn0, the first variable resistor 121 raises the gate voltage Vg of the PMOS transistor 130 to the voltage Vcc. However, since the NMOS transistor 122 has been turned on in response to the high control signal D2, the second variable resistor 123 is coupled to the first variable resistor 121. Thus, the gate voltage Vg of the PMOS transistor 130 results in a voltage generated, based on the voltage Vcc, by the first variable resistor 121, the second variable resistor 123, and the Zener diode 132. The gate voltage Vg in this case is higher than the gate voltage Vg in the state 2.

At this time, the resistance value of the second variable resistor 123 is R2c, and a pull-down current Ids122c of the gate electrode of the PMOS transistor 130 at this time is further smaller than Ids122b. Note that the resistance value R2c is larger than the resistance value R2b.

Here, the current Ids122c is (5V−Vgs3)/R2c. Since the current Ids122c flowing through the NMOS transistor 122 is smaller than the current Ids122b in the state 2, the voltage Vgs3 is slightly smaller than the voltage Vgs2 in the state 2.

Thus, the gate voltage Vg of the PMOS transistor 130 is given by the following expression:

$$Vg = Vcc - (Vz + Rz \times Ids122c)/(1 + Rz/R1b) \qquad (3a)$$

where Vz is a voltage at the Zener diode 132 upon a current starting to flow, Rz is the dynamic resistance of the Zener diode 132 when a current flows through the Zener diode 132, and the current Ids122c is a pull-down current of the gate electrode of the PMOS transistor 130 (i.e., a drain-source current of the NMOS transistor 122) in the state 3.

Also, when the difference in voltage between the voltage Vg and the power supply voltage Vcc is smaller than the voltage Vz, and no current flows through the Zener diode 132, the gate voltage Vg of the PMOS transistor 130 is given by the following expression:

$$Vg = Vcc - R1b \times Ids122c \qquad (3b)$$

The output circuit 102 applies the gate voltage Vg outputted from the voltage output circuit 101 to the PMOS transistor 130, and generates a voltage Vdr. Note that the NMOS transistor 131 is off because the control signal D3 is low.

<<<<Operation of First Drive Circuit in Non-Drive State>>>>

In the non-drive state, the control circuit 70 causes the control signals D0 to D2 to be low and the control signal D3 to be low.

Accordingly, in the non-drive state, there is no change in the control signal D0 from the state 3, and thus a description of the level shift circuit 100 is omitted here.

When the level shift circuit 100 outputs the low signal Vn0, the first variable resistor 121 raises the gate voltage Vg of the PMOS transistor 130 to the voltage Vcc. Then, since the NMOS transistor 122 has been turned off in response to the low control signal D2, the second variable resistor 123 is not coupled to the first variable resistor 121. Accordingly, the gate voltage Vg of the PMOS transistor 130 becomes equal to the voltage Vcc.

The output circuit 102 applies the gate voltage Vg outputted from the voltage output circuit 101 to the PMOS transistor 130, and generates a voltage Vdr. Note that the NMOS transistor 131 is off because the control signal D3 is low.

As has been described above, in the transition from the state 1 to the state 3, the driving capability of the PMOS transistor 130 is gradually lowered, the gate voltage Vg gradually increases, and the on-resistance of the power transistor 23 also gradually increases.

The voltage drive period has a period of time of the state 1 during which the driving capability is relatively high, and periods of time of the states 2 and 3, subsequent to the state 1, during which the driving capability is relatively low. Here, the period of time of the state 1 corresponds to a "first sub-period," and the periods of time of the states 2 and 3 correspond to a "second sub-period."

Note that the gate voltage Vg of the PMOS transistor 130 is lower than the power supply voltage Vcc by about 5 V in the state 1, is lower than the power supply voltage Vcc by about 3 V, in the state 2, and is lower than the power supply voltage Vcc by about 2.5 V in the state 3.

Accordingly, the driving capability of the PMOS transistor 130 is lowered in stages and the on-resistance thereof is increased in stages, with an increase in the gate voltage Vg as the state transitions from the state 1 to the non-drive state. Although the gate voltage Vg is changed in stages in an embodiment of the present disclosure, the gate voltage Vg may be changed gradually.

<<<Operation of First Drive Circuit 71 when Signal IN is High and Signal En is Low>>>

When the signal IN is high and the signal en is low, the first drive circuit 71 operates to undergo two states: the state 4 and the state 5. In this case, when the voltage Vcc_div drops below the reference voltage VREF5 and the signal VLL goes high, the resistance values of the variable resistors 115, 117 decrease. Similarly, the resistance value of the second variable resistor 123 changes in response to the control signals D0, D1, but the resistance value of the second variable resistor 123 when the signal VLL is high is smaller than that when the signal VLL is low.

In the configuration described above, when the enable circuit 54 outputs a low signal en, the first drive circuit 71 lowers the driving capability of the PMOS transistor 130 in stages and increases the on-resistance of the PMOS transistor 130 in stages, with an increase in the gate voltage Vg as the state transitions from the state 4 to the state 5.

Specifically, in the state 4, the first drive circuit 71 applies the minimum gate voltage Vg to the PMOS transistor 130 to provide the maximum driving capability of the PMOS transistor 130 and minimize the on-resistance of the PMOS transistor 130.

Then, in the state 5, the first drive circuit 71 applies the gate voltage Vg that is higher than that in the state 4 to the PMOS transistor 130, to provide the driving capability of the PMOS transistor 130 lower than that in the state 4, and increase the on-resistance of the PMOS transistor 130 to be larger than that in the state 4.

The following specifically describes the operation of the first drive circuit 71 in each of the state 4 and the state 5 and how the gate voltage Vg changes.

<<<<Operation of First Drive Circuit in State 4>>>>

In the state 4, similarly to the state 1, the control circuit 70 causes the control signals D0 to D2 to be high and the control signal D3 to be low.

Thus, when the control circuit 70 outputs the high control signal D0, the level shift circuit 100 in the state 4 operates such that the NMOS transistor 110 is turned on and the logic level at the node N1 is low. Thus, in the level shift circuit 100, the PMOS transistor 111 is turned on, the level at the node N0 goes high, and as a result, the PMOS transistor 112 is turned off. Then, the level shift circuit 100 outputs the high signal Vn0.

When the level shift circuit 100 outputs the high signal Vn0, the first variable resistor 121 raises the gate voltage Vg of the PMOS transistor 130 to the voltage Vcc. However, since the NMOS transistor 122 has been turned on in response to the high control signal D2, the second variable resistor 123 is coupled to the first variable resistor 121. Thus, the gate voltage Vg of the PMOS transistor 130 results in a minimum voltage generated, based on the voltage Vcc, by the first variable resistor 121, the second variable resistor 123, and the Zener diode 132. The gate voltage Vg at this time is generated based on Expression (1) in the state 1.

The output circuit 102 applies the gate voltage Vg outputted from the voltage output circuit 101 to the PMOS transistor 130, and generates a voltage Vdr. Note that the NMOS transistor 131 is off because the control signal D3 is low.

<<<<Operation of First Drive Circuit in State 5>>>>

In the state 5, similarly to the state 3, the control circuit 70 causes the control signals D0 and D1 to be low, the control signal D2 to be high, and the control signal D3 to be low.

Thus, when the control circuit 70 outputs the low control signal D0, the level shift circuit 100 in the state 5 operates such that the NMOS transistor 113 is turned on and the logic level at the node N0 is low. Thus, the level shift circuit 100 outputs the low signal Vn0.

When the level shift circuit 100 outputs the low signal Vn0, the first variable resistor 121 raises the gate voltage Vg of the PMOS transistor 130 to the voltage Vcc. However, since the NMOS transistor 122 has been turned on in response to the high control signal D2, the second variable resistor 123 is coupled to the first variable resistor 121. Thus, the gate voltage Vg of the PMOS transistor 130 results in a voltage generated, based on the voltage Vcc, by the first variable resistor 121, the second variable resistor 123, and the Zener diode 132. The gate voltage Vg in this case is higher than the gate voltage Vg in the state 4. The gate voltage Vg at this time is generated based on Expression (3a) or (3b) in the state 3.

The output circuit 102 applies the gate voltage Vg outputted from the voltage output circuit 101 to the PMOS transistor 130, and generates a voltage Vdr. Note that the NMOS transistor 131 is off because the control signal D3 is low.

As has been described above, when the state transitions from the state 4 to the state 5, the driving capability of the PMOS transistor 130 is lowered, the gate voltage Vg increases, and the on-resistance of the power transistor 23 also increases.

Further, the voltage drive period has a period of time of the state 4 during which the driving capability is relatively high, and a period of the state 5, subsequent to the state 4, during which the driving capability is relatively low.

Thus, the driving capability of the PMOS transistor 130 changes in stages and also the on-resistance thereof changes in stages, with a change in the gate voltage Vg as the state transitions from the state 4 to the state 5. The voltage Vdr at this time is equal to the power supply voltage Vcc.

<<<Operation of First Drive Circuit 71 when Signal IN is Low>>>

When the signal IN is low, the control circuit 70 outputs the high control signal D3 and thus the first drive circuit 71 operates such that the voltage Vdr is to be at the ground level through the terminal OUT. When the signal IN is low, the logic levels of the control signals D0 to D3 are such that the logic levels of the control signals D0 to D2 are low and the logic level of the control signal D3 is high, irrespective of the logic level of the signal en. The following describes the operation of the first drive circuit 71 when the signal IN is low.

When the signal IN is low and the control circuit 70 outputs the low control signal D0, the level shift circuit 100 operates such that the NMOS transistor 113 is turned on and the logic level at the node N0 is low. Then, the PMOS transistor 112 is turned on, and the logic level at the node N1 goes high. As a result, the PMOS transistor 111 is turned off, and the level shift circuit 100 outputs the low signal Vn0.

When the level shift circuit 100 outputs the low signal Vn0, the first variable resistor 121 raises the gate voltage Vg of the PMOS transistor 130 to the voltage Vcc. Then, since the NMOS transistor 122 has been turned off in response to the low control signal D2, the second variable resistor 123 is not coupled to the first variable resistor 121. Thus, the gate voltage Vg of the PMOS transistor 130 becomes equal to the voltage Vcc.

Since the control circuit 70 outputs the high control signal D3, the output circuit 102 turns on the NMOS transistor 131. At this time, the voltage Vdr results in the ground voltage. Note that the PMOS transistor 130 is off because the gate voltage Vg is equal to the power supply voltage Vcc.

<<<Configuration and Operation of Second Drive Circuit 72>>>

Figure 8:
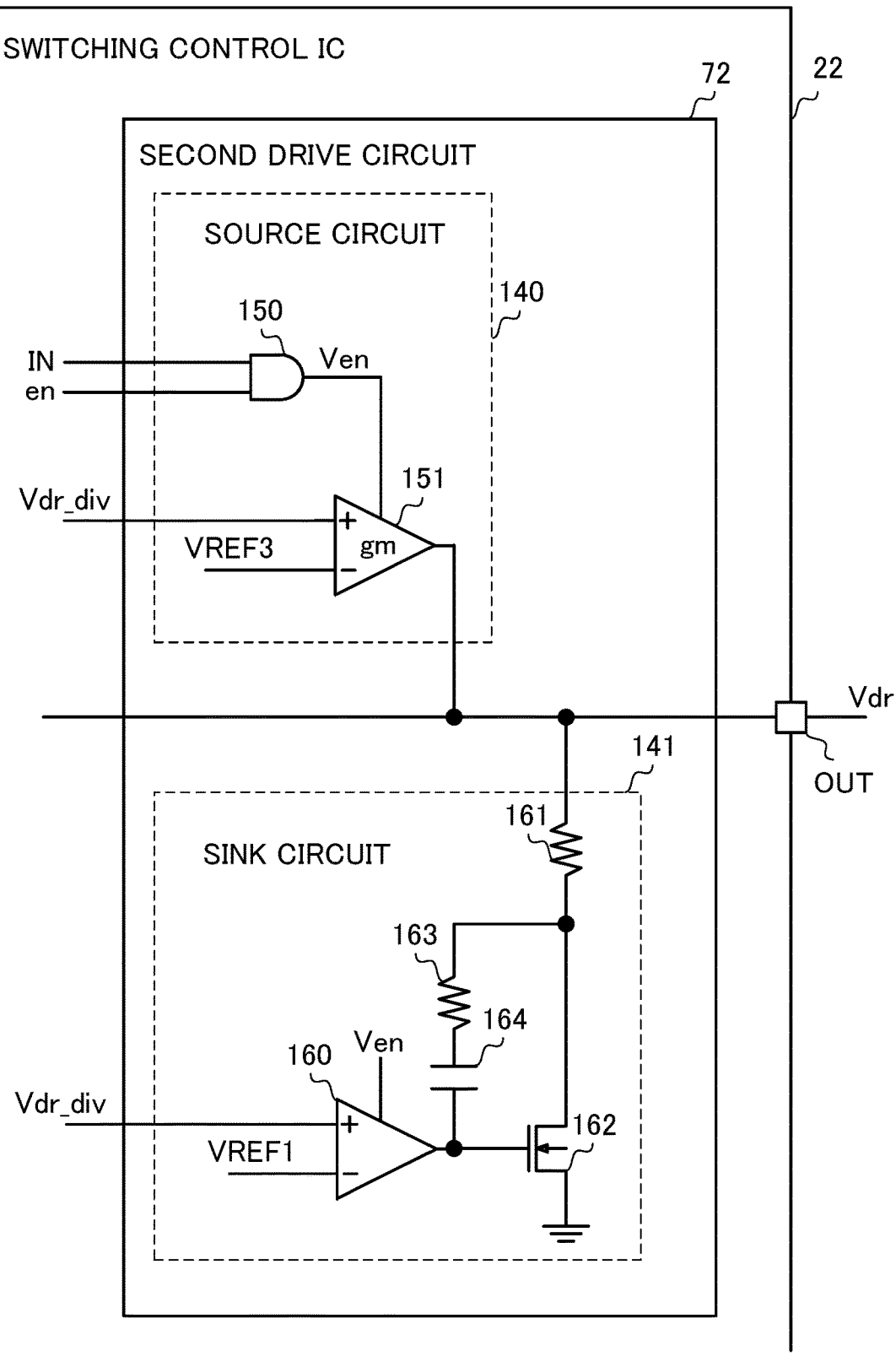
FIG. 8 is a diagram illustrating an example of a second drive circuit 72.

FIG. 8 is a diagram illustrating an example of the second drive circuit 72. When the signal IN is high and the signal en is high, the second drive circuit 72 supplies a source current to the terminal OUT and receives a sink current from the terminal OUT. The second drive circuit 72 comprises a source circuit 140 and a sink circuit 141.

The source circuit 140 supplies a source current to the terminal OUT according to the difference between the voltage Vdr_div and the reference voltage VREF3 (e.g., 1.5 V), and comprises an AND circuit 150 and a voltage control current source circuit (operational transconductance amplifier) 151.

The AND circuit 150 performs the logical product of the signal IN and the signal en, and outputs the result as a signal Ven. When the signal Ven is high, the voltage control current source circuit 151 operates. When the signal Ven is low, the voltage control current source circuit 151 stops operating. Note that a period of time during which the signal Ven is high is referred to as a current drive period. Further, the current drive period is longer than the voltage drive period and includes at least part of the voltage drive period.

The voltage control current source circuit 151 supplies a source current to the terminal OUT according to the difference between the voltage Vdr_div and the reference voltage VREF3 such that the voltage Vdr_div will become equal to the reference voltage VREF3.

Accordingly, when the voltage Vdr_div exceeds the reference voltage VREF3, a source current is stopped. In contrast, when the voltage Vdr_div is lower than the reference voltage VREF3, a source current increases to raise the voltage Vdr gradually. Note that the reference voltage VREF3 is set to be higher than the threshold of the power transistor 23 and to be lower than the withstand voltage of the power transistor 23. Here, the "withstand voltage" refers to the gate-source withstand voltage of the power transistor 23.

The sink circuit 141 generates a sink current to receive a current from the terminal OUT according to the difference between the voltage Vdr_div and the reference voltage VREF1 (e.g., 1.6 V). The sink circuit 141 comprises a comparator 160, a resistor 161 for current limiting, an NMOS transistor 162 which is an output transistor, and a capacitor 164 and a resistor 163 for phase compensation. Although the comparator 160 is used in an embodiment of the present disclosure, an operational amplifier may be used instead.

When the signal Ven is high, the comparator 160 operates. When the signal Ven is low, the comparator 160 does not operate and is designed to turn off the NMOS transistor 162, and thus, a sink current does not flow. In other words, when the signal Ven is low, the sink circuit 141 stops operating.

Specifically, when the voltage Vdr_div exceeds the reference voltage VREF1, a current is supplied to the gate electrode of the NMOS transistor 162, to decrease the on-resistance of the NMOS transistor 162. In contrast, when the voltage Vdr_div is lower than the reference voltage VREF1, a current is received from the gate electrode of the NMOS transistor 162, to increase the on-resistance of the NMOS transistor 162.

When the on-resistance of the NMOS transistor 162 decreases, the sink circuit 141 receives more sink current from the terminal OUT through the resistor 161. In contrast, when the on-resistance of the NMOS transistor 162 increases, the sink circuit 141 receives, from the terminal OUT, a sink current less than that when the on-resistance of the NMOS transistor 162 is low.

Accordingly, the sink current increases more when the voltage Vdr_div exceeds the reference voltage VREF1, as compared to when the voltage Vdr_div is lower than the reference voltage VREF1. In other words, if the voltage Vdr_div exceeds the reference voltage VREF1, the sink current increases even more, thereby restraining an increase in the voltage Vdr. Note that the reference voltage VREF1 is set to be higher than the reference voltage VREF3 and to be lower than the withstand voltage of the power transistor 23.

Further, the second drive circuit 72 has a driving capability lower than that in the first drive circuit 71.

<<<Example of Operation of Switching Control IC 22 when Signal En is High>>>

The following describes the operation of the switching control IC 22 when the signal en is high. Note that an output current Iout in FIGS. 9 and 10 is illustrated such that a current outputted from the terminal OUT is negative.

Figure 9:
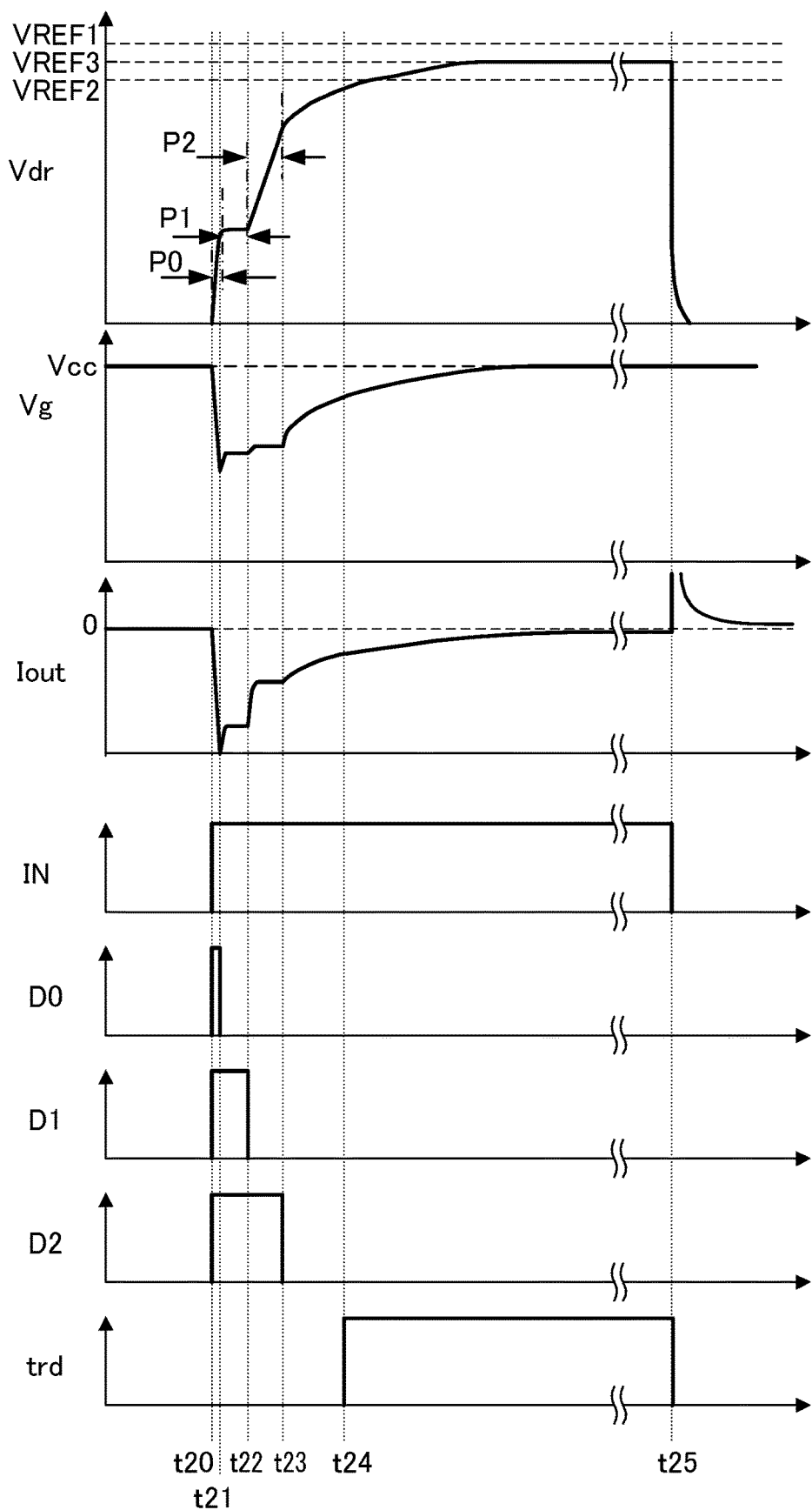
FIG. 9 is a diagram illustrating an example of the operation of a switching control IC 22 when a voltage Vdr is lower than a lower-limit level.
Figure 10:
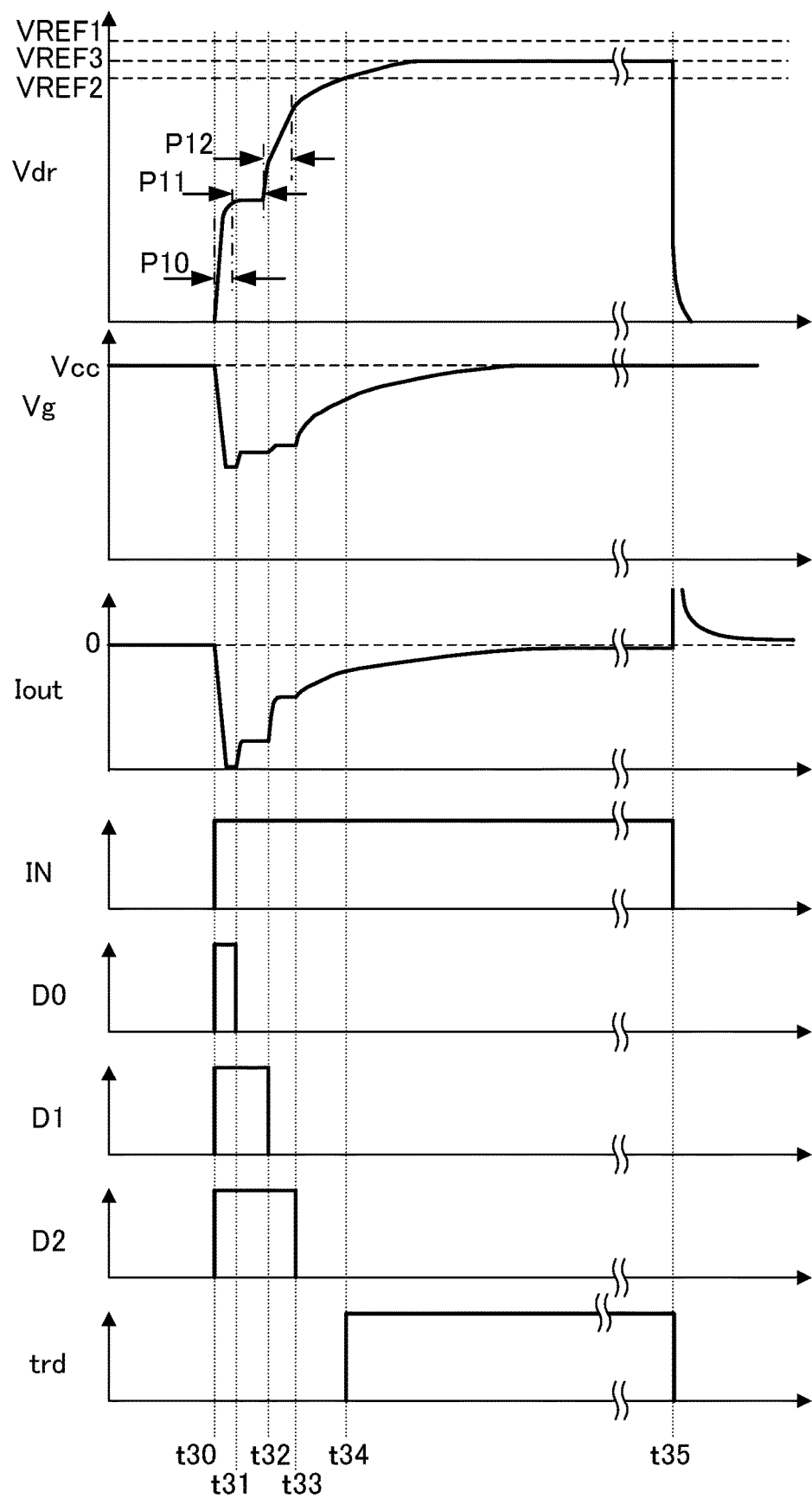
FIG. 10 is a diagram illustrating an example of the operation of a switching control IC 22 to raise a voltage Vdr to or above a lower-limit level.

FIG. 9 is a diagram illustrating an example of the operation of the switching control IC 22 when the voltage Vdr is lower than a lower limit level. Further, FIG. 9 is a diagram illustrating the operation of the switching control IC 22 when the reset signal rst is high and the voltage drive period is in an initial state. In FIG. 9, the hysteresis comparator 67 outputs a low signal VLL because the voltage Vcc_div exceeds the reference voltage VREF4. Thus, in the explanation of FIG. 9, there is no need to consider a decrease in the resistance value of the second variable resistor 123 in response to the signal VLL.

At time t20, when the SR flip-flop 57 outputs the high signal IN, the adjustment circuit 81 outputs the high control signals D0 to D2, in the state 1, thereby starting a voltage drive period. At this time, the adjustment circuit 81 outputs the low control signal D3.

Further, the second drive circuit 72 supplies a source current to the terminal OUT in accordance with a voltage Vdr_div. Then, the timer 92 starts measuring a predetermined period of time ta.

At this time, the gate voltage Vg of the PMOS transistor 130 is a minimum voltage, the driving capability of the PMOS transistor 130 is maximum, the on-resistance of the PMOS transistor 130 is minimum, and the output current Iout from the PMOS transistor 130 is maximum. As a result, the voltage Vdr increases with a maximum slope.

Note that the voltage Vdr rapidly rises during a period P0 illustrated in FIG. 9 because a parasitic capacitance Cgs between the gate and source of the power transistor 23 is charged with a current corresponding to the gate voltage Vg of the PMOS transistor 130 until the power transistor 23 changes from an off-state to an on-state.

At time t21, the adjustment circuit 81 outputs the low control signal D0 in the state 2.

At this time, the gate voltage Vg of the PMOS transistor 130 exceeds the voltage in the state 1, the driving capability of the PMOS transistor 130 lowers, the on-resistance increases, and the output current Iout decreases, as compared to those in the state 1. As a result, the voltage Vdr remains flat.

Note that, in the period P1, the power transistor 23 is on, and thus the voltage at the drain electrode of the power transistor 23 drops. At this time, a parasitic capacitance Cgd between the gate and drain of the power transistor 23 is charged with a current corresponding to the gate voltage Vg of the PMOS transistor 130. Thus, the drop in the drain voltage of the power transistor 23 caused by turning on of the power transistor 23 and charging of the parasitic capacitance Cgd counterbalance, and thus the voltage Vdr remains flat.

At time t22, the adjustment circuit 81 outputs the low control signal D1 in the state 3.

At this time, the gate voltage Vg of the PMOS transistor 130 exceeds the voltage in the state 2, the driving capability of the PMOS transistor 130 further lowers, the on-resistance further increases, and the output current Iout further decreases, as compared to those in the states 1 and 2. As a result, the voltage Vdr increases with a slope gentler than that in the state 1.

Note that, in the period P2, the drain voltage of the power transistor 23 sufficiently gets close to the ground. The voltage Vdr increases with the parasitic capacitances Cgd and Cgs of the power transistor 23 being charged with a current corresponding to the gate voltage Vg of the PMOS transistor 130. Since the gate voltage Vg of the PMOS transistor 130 is higher than that in the period P0, an increase in the voltage Vdr is gradual.

In the periods P1 and P2, to turn on the power transistor 23, the first drive circuit 71 charges the parasitic capacitance of the power transistor 23 while lowering the driving capability during the voltage drive period, and after this charging and the change in the voltage level of the output electrode of the power transistor 23 counterbalance, further charges the parasitic capacitance of the power transistor 23.

As a result, to turn on the power transistor 23, the first drive circuit 71 discontinuously changes the rate of rise in the voltage Vdr for driving the power transistor 23. Specifically, the voltage Vdr first rises with a steep slope A1 based on a charging current for turning on the power transistor 23. Then, upon turning on of the power transistor 23, the slope A2 of the voltage Vdr decreases with a change in the charging current caused by turning on of the power transistor 23, and the voltage Vdr becomes substantially flat. Thereafter, when the power transistor 23 is further turned on with the charging current, a change in the charging current stabilizes, and the voltage Vdr rises with a slope A3 that is gentler than the slope A1. Accordingly, the voltage Vdr rises with two inflection points. Note that the "inflection point" herein refers to a point at which the slope of the voltage Vdr changes.

At time t23, the adjustment circuit 81 outputs the low control signal D2, in the non-drive state, and the voltage drive period ends.

At this time, the gate voltage Vg of the PMOS transistor 130 is pulled up and gradually becomes equal to the power supply voltage Vcc.

At time t24, at which the predetermined period of time to has elapsed since time t20, the timer 92 outputs a high clock signal trd.

At this time, the voltage Vdr is lower than the lower limit level (i.e., the voltage Vdr_div is lower than the reference voltage VREF2). Accordingly, when the voltage Vdr_div is lower than the reference voltage VREF2 two more times at the rising edge of the clock signal trd, the determination circuit 80 outputs a signal Sup.

At time t25, at which the SR flip-flop 57 outputs a low signal IN, the timer 92 outputs a low clock signal trd.

Meanwhile, the second drive circuit 72 stops supplying a source current to the terminal OUT in accordance with the voltage Vdr_div.

FIG. 10 is a diagram illustrating an example of the operation of the switching control IC 22 when raising the voltage Vdr to or above the lower limit level. From time t30 to time t35, the circuits operate substantially in the same manner as from time t20 to time t25 in FIG. 9. Note that the reason for the changes in the voltage Vdr in periods P10 to P12 in FIG. 10 is similar to the reason for the changes in the voltage Vdr in the periods P0 to P2 in FIG. 9. Further, in FIG. 10, the hysteresis comparator 67 outputs a low signal VLL because the voltage Vcc_div exceeds the reference voltage VREF4. Thus, in the explanation of FIG. 10, there is no need to consider a decrease in the resistance value of the second variable resistor 123 in response to the signal VLL.

FIG. 10 differs from FIG. 9 in that, after the determination circuit 80 outputs the signal Sup, the voltage drive period increases, and as a result, the voltage Vdr exceeds the lower limit level (i.e., the voltage Vdr_div exceeds the reference voltage VREF2) at time t34. Thus, the determination circuit 80 stops outputting the signal Sup at time t34.

Accordingly, when the voltage Vdr is lower than the lower limit level, the switching control IC 22 can control the first drive circuit 71 and the second drive circuit 72 such that the voltage Vdr will fall within a predetermined range.

Figure 11:
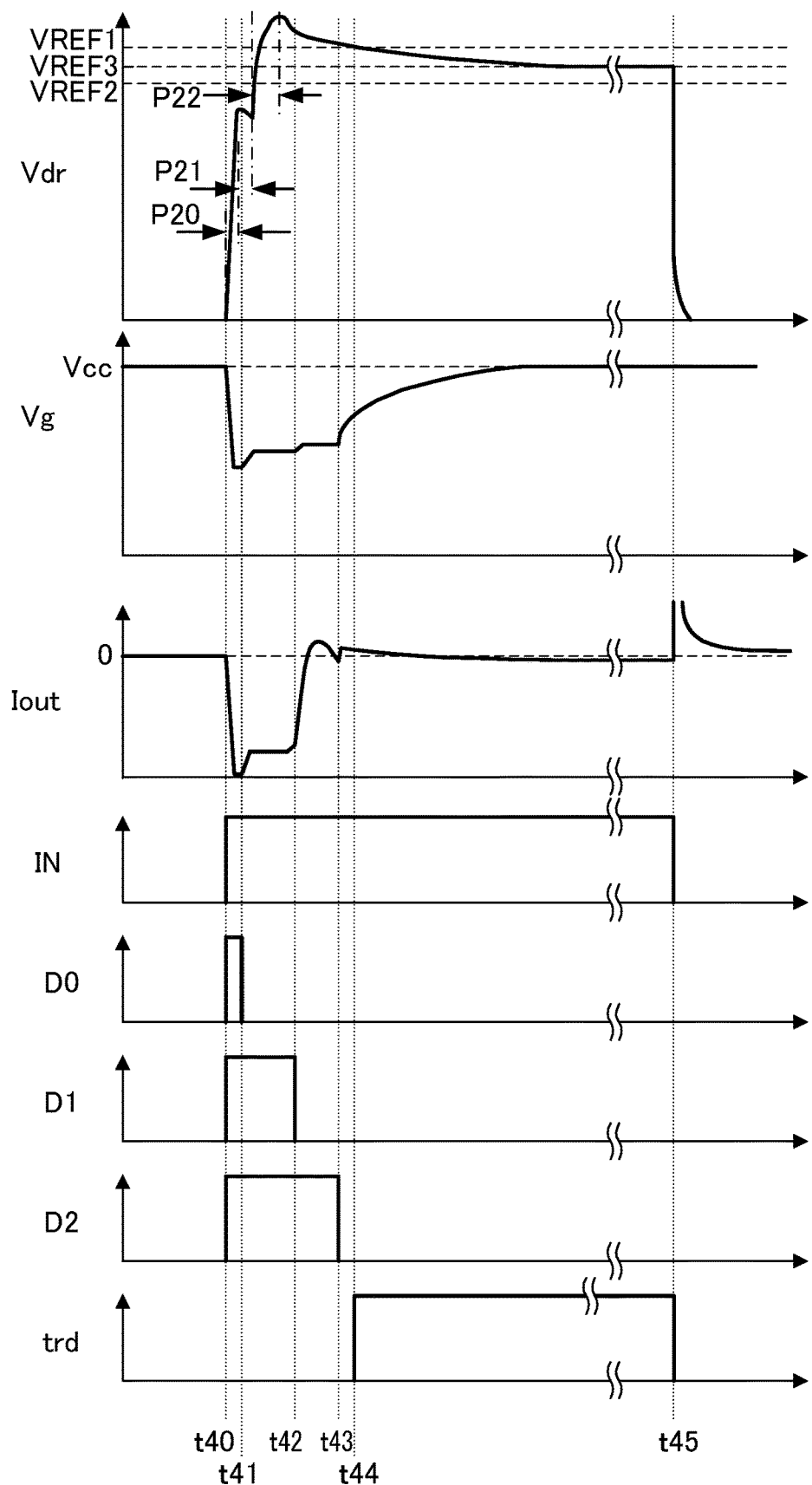
FIG. 11 is a diagram illustrating an example of the operation of a switching control IC 22 when a voltage Vdr exceeds an upper-limit level.

FIG. 11 is a diagram illustrating an example of the operation of the switching control IC 22 when the voltage Vdr exceeds the upper limit level. Note that, in FIGS. 11 and 12, the output current Iout is illustrated such that a current outputted from the terminal OUT is negative. Further, in FIG. 11, the hysteresis comparator 67 outputs a low signal VLL because the voltage Vcc_div is higher than the reference voltage VREF4. Thus, in the explanation of FIG. 11, there is no need to consider a decrease in the resistance value of the second variable resistor 123 in response to the signal VLL.

At time t40, when the SR flip-flop 57 outputs a high signal IN, the adjustment circuit 81 outputs the high control signals D0 to D2 in the state 1, thereby starting a voltage drive period. At this time, the adjustment circuit 81 outputs the low control signal D3.

Further, the second drive circuit 72 supplies a source current to the terminal OUT in accordance with a voltage Vdr_div. Then, the timer 92 starts measuring the predetermined period of time ta.

At this time, the gate voltage Vg of the PMOS transistor 130 is a minimum voltage, the driving capability of the PMOS transistor 130 is maximum, the on-resistance of the PMOS transistor 130 is minimum, and the output current Iout from the PMOS transistor 130 is maximum. As a result, the voltage Vdr increases with a maximum slope.

Note that the voltage Vdr rapidly rises during a period P20 illustrated in FIG. 11 because the parasitic capacitance Cgs between the gate and source of the power transistor 23 is charged with a current corresponding to the gate voltage Vg of the PMOS transistor 130 until the power transistor 23 changes from an off-state to an on-state.

At time t41, the adjustment circuit 81 outputs the low control signal D0 in the state 2.

At this time, the gate voltage Vg of the PMOS transistor 130 exceeds the voltage in the state 1, the driving capability of the PMOS transistor 130 lowers, the on-resistance increases, and the output current Iout decreases, as compared to those in the state 1. As a result, the voltage Vdr decreases slightly.

Note that, in the period P21, the power transistor 23 is on, and thus the voltage at the drain electrode of the power transistor 23 drops. At this time, the parasitic capacitance Cgd between the gate and drain of the power transistor 23 is charged with a current corresponding to the gate voltage Vg of the PMOS transistor 130. Thus, the drop in the drain voltage of the power transistor 23 caused by turning on of the power transistor 23 and charging of the parasitic capacitance Cgd counterbalance.

However, the gate voltage of the NMOS transistor 162 rapidly increases because the capacitor 164 and the resistor 163 for phase compensation in the sink circuit 141 are coupled to the gate electrode of the NMOS transistor 162. Accordingly, the sink circuit 141 operates, and the voltage Vdr decreases slightly, thereby changing in an upwardly convex curve.

At time t42, the adjustment circuit 81 outputs the low control signal D1 in the state 3.

At this time, the gate voltage Vg of the PMOS transistor 130 exceeds the voltage in the state 2, the driving capability of the PMOS transistor 130 further lowers, the on-resistance further increases, and the output current Iout further decreases, as compared to those in the states 1 and 2. As a result, the voltage Vdr increases with a slope gentler than that in the state 1.

Note that, in the period P22, the voltage at the drain electrode of the power transistor 23 sufficiently gets close to the ground. The voltage Vdr increases with the parasitic capacitances Cgd and Cgs of the power transistor 23 being charged with a current corresponding to the gate voltage Vg of the PMOS transistor 130. Since the gate voltage Vg of the PMOS transistor 130 exceeds the gate voltage Vg in the period P20, an increase in the voltage Vdr is gradual.

However, as in the period P21, the gate voltage of the NMOS transistor 162 rapidly increases because the capacitor 164 and the resistor 163 for phase compensation in the sink circuit 141 are coupled to the gate electrode of the NMOS transistor 162. Accordingly, the sink circuit 141 operates, and thus the voltage Vdr decreases slightly, thereby changing in an upwardly convex curve.

In the periods P21 and P22, to turn on the power transistor 23, the first drive circuit 71 charges the parasitic capacitance of the power transistor 23 while lowering the driving capability during the voltage drive period, and after this charging and the change in the voltage level of the output electrode of the power transistor 23 counterbalance, further charges the parasitic capacitance of the power transistor 23. At this time, the second drive circuit 72 generates a sink current to lower the driving capability.

Thus, to turn on the power transistor 23, the first drive circuit 71 discontinuously raises the voltage Vdr for driving the power transistor 23. At the same time, the second drive circuit 72 generates a sink current. As a result, the voltage Vdr for driving the power transistor 23 increases with two local maximum values, and then results in substantially a predetermined voltage.

In other words, the voltage Vdr first rises with a steep slope B1 based on a charging current for turning on the power transistor 23. Then, upon turning on of the power transistor 23, the slope B2 of the voltage Vdr becomes negative and decreases, due to the effect of the sink current for turning off the power transistor 23 and a change in the charging current caused by turning on of the power transistor 23. Thereafter, when the power transistor 23 is turned on with a charging current, the change in the charging current stabilizes, and the voltage Vdr increases with a slope B3 that is gentler than the slope B1. However, due to the effect of the sink current, the voltage Vdr thereafter becomes negative and decreases with a slope B4. Then, the voltage Vdr results in substantially a predetermined voltage.

At time t43, the adjustment circuit 81, in the non-drive state, outputs the low control signal D2, and the voltage drive period ends.

At this time, the gate voltage Vg of the PMOS transistor 130 is pulled up and gradually reaches the power supply voltage Vcc.

At time t44, at which the predetermined period of time to has elapsed since time t40, the timer 92 outputs a high clock signal trd.

At this time, the voltage Vdr exceeds the upper limit level (i.e., the voltage Vdr_div exceeds the reference voltage VREF3). Accordingly, if the voltage Vdr_div exceeds the reference voltage VREF3 two more times at the rising edge of the clock signal trd, the determination circuit 80 outputs a signal Sdown.

When the SR flip-flop 57 outputs a low signal IN at time t45, the timer 92 outputs a low clock signal trd.

Meanwhile, the second drive circuit 72 stops supplying a source current to the terminal OUT in accordance with the voltage Vdr_div.

Figure 12:
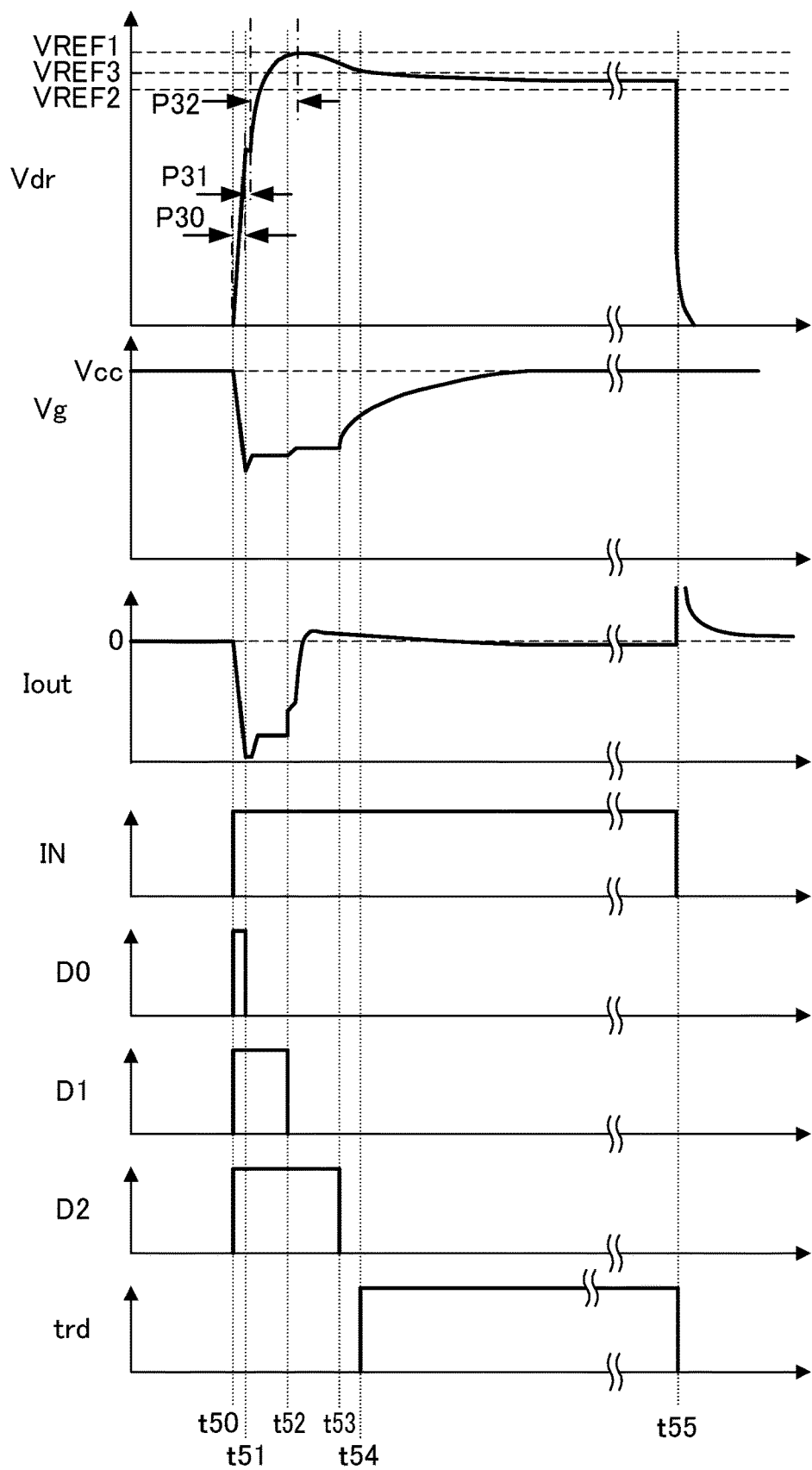
FIG. 12 is a diagram illustrating an example of the operation of a switching control IC 22 to lower a voltage Vdr to or below an upper-limit level.

FIG. 12 is a diagram illustrating an example of the operation of the switching control IC 22 when lowering the voltage Vdr to or below the upper limit level. From time t50 to time t55, the circuits operate substantially in the same manner as from time t40 to time t45 in FIG. 11. Note that the reason for the changes in the voltage Vdr in the periods P30 to P32 in FIG. 12 is similar to the reason for the changes in the voltage Vdr in the periods P20 to P22 in FIG. 11. Further, in FIG. 12, the hysteresis comparator 67 outputs a low signal VLL because the voltage Vcc_div exceeds the reference voltage VREF4. Thus, in explanation of FIG. 12, there is no need to consider a decrease in the resistance value of the second variable resistor 123 in response to the signal VLL.

FIG. 12 differs from FIG. 11 in that, after the determination circuit 80 outputs the signal Sdown, the voltage drive period decreases, and as a result, the voltage Vdr drops below the upper limit level (i.e., the voltage Vdr_div drops below the reference voltage VREF3) at time t54. Thus, the determination circuit 80 stops outputting the signal Sdown at time t54.

Accordingly, when the voltage Vdr is higher than the upper limit level, the switching control IC 22 can control the first drive circuit 71 and the second drive circuit 72 such that the voltage Vdr will fall within a predetermined range.

The following describes the relationships among FIGS. 9 and 12 referring back to FIGS. 3 and 4. The switching control IC 22 may operate as in FIG. 9 in the N−2-th and N−1-th periods in FIGS. 3 and 4, and operate as in FIG. 9 in the N-th period in FIGS. 3 and 4 as well. In this case, in the N-th period in FIGS. 3 and 4, the determination circuit 80 outputs a high signal Sup. As a result, in the N+1-th period in FIGS. 3 and 4, the switching control IC 22 operates as in FIG. 10.

Meanwhile, the switching control IC 22 may operate as in FIG. 11 in the N−2-th and N−1-th periods in FIGS. 3 and 4, and operate as in FIG. 11 in the N-th period in FIGS. 3 and 4 as well. In this case, in the N-th period in FIGS. 3 and 4, the determination circuit 80 outputs a high signal Sdown. As a result, in the N+1-th period in FIGS. 3 and 4, the switching control IC 22 operates as in FIG. 12.

<<<Example of Operation of Switching Control IC 22 when Signal En is Low>>>

Figure 13:
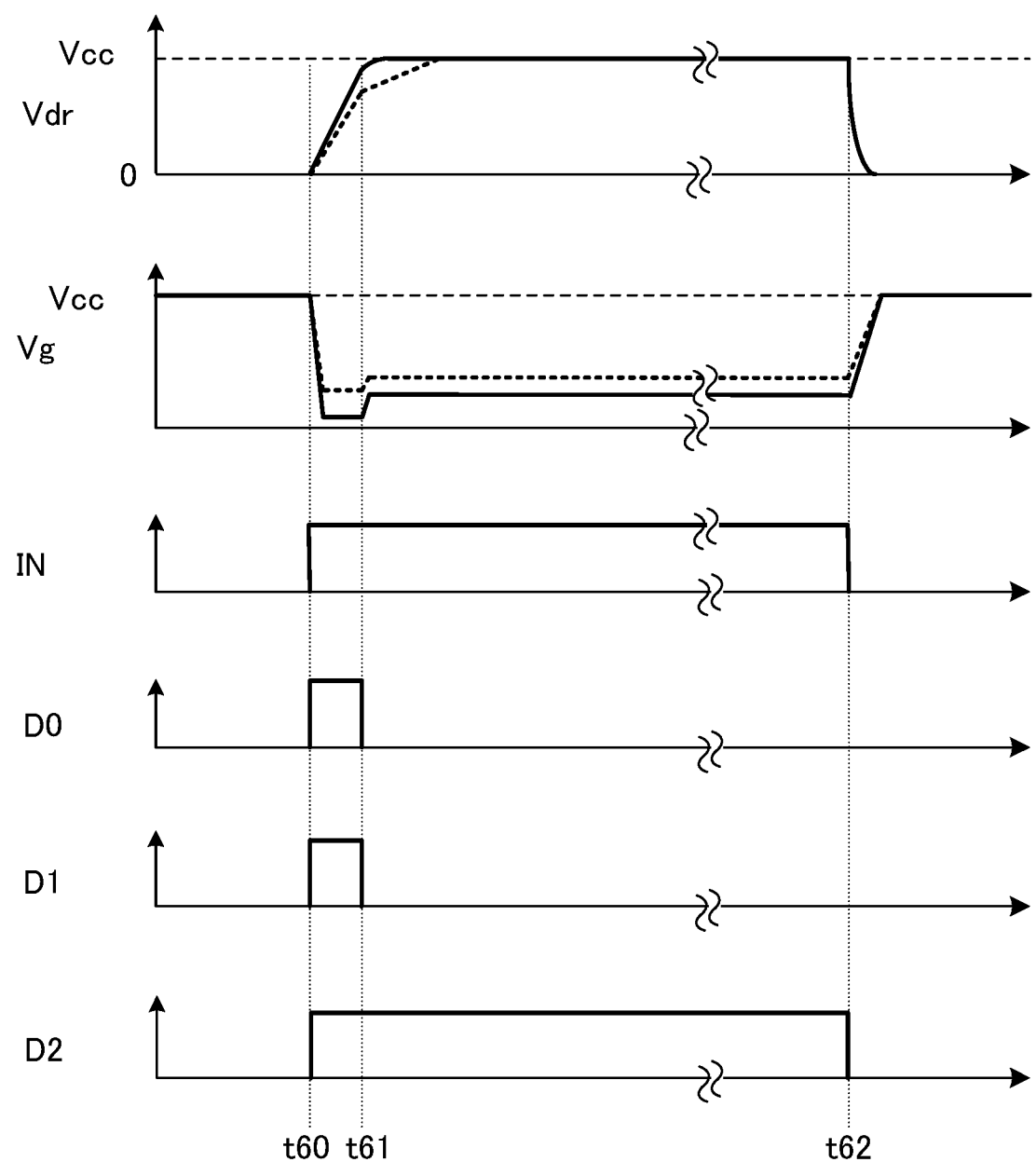
FIG. 13 is a diagram illustrating an example of the operation of a switching control IC 22 when a signal en is low.

The following describes the operation of the switching control IC 22 when the signal en is low. FIG. 13 is a diagram illustrating an example of the operation of the switching control IC 22 when the signal en is low.

The following describes not only the operation of the switching control IC 22 when the hysteresis comparator 67 outputs a high signal VLL, but also the operation of the switching control IC 22 when the signal VLL is low. The resistance value of the second variable resistor 123 when the signal VLL is high is smaller than that when the signal VLL is low, thereby increasing a pull-down current that flows through the Zener diode 132.

When the SR flip-flop 57 outputs a high signal IN at time t60, the adjustment circuit 81 outputs the high control signals D0 to D2. At this time, the adjustment circuit 81 outputs the low control signal D3.

Further, the second drive circuit 72 stops operating because the signal en is low.

At this time, in the state 4, the gate voltage Vg of the PMOS transistor 130 (indicated by a solid line) is a minimum voltage, the driving capability of the PMOS transistor 130 is maximum, and the on-resistance of the PMOS transistor 130 is minimum. As a result, the voltage Vdr (indicated by a solid line) increases with a maximum slope.

Here, the gate voltage Vg (indicated by a solid line) drops below the gate voltage Vg at the time when the signal VLL is low (indicated by a broken line) because the pull-down current increases. This increases the driving capability of the PMOS transistor 130 higher than that when the signal VLL is low. As a result, in the period of time from time t60 to time t61, the slope of the rise in the voltage Vdr (indicated by a solid line) is steeper than that of the voltage Vdr when the signal VLL is low (indicated by a broken line).

The power supply voltage Vcc that is a driving voltage is lower than that in the states illustrated in FIGS. 9 to 12, and the gate voltage Vg (indicated by a solid line) continues being a minimum voltage for a longer time. Accordingly, the voltage Vdr does not undergo the transition with two inflection points as illustrated with the periods P0 to P2.

Similarly, the power supply voltage Vcc that is a driving voltage is lower than that in the states explained with reference to FIGS. 9 to 12, and the gate voltage Vg (indicated by a solid line) continues being a minimum voltage for a longer time, thereby causing the second drive circuit 72 not to operate. Accordingly, the voltage Vdr does not undergo the transition with two upwardly convex curves as explained with the periods P20 to P22.

At time t61, the adjustment circuit 81 outputs the low control signals D0 and D1 in the state 5.

At this time, the gate voltage Vg of the PMOS transistor 130 (indicated by a solid line) is higher than that in the state 4, the driving capability of the PMOS transistor 130 lowers and the on-resistance increases, as compared to those in the state 4. As a result, the voltage Vdr (indicated by a solid line) increases with a slope gentler than that in the state 4. Then, from the time at which the voltage Vdr (indicated by a solid line) has reached the power supply voltage Vcc, the voltage Vdr remains flat.

When the SR flip-flop 57 outputs a low signal IN at time t62, the adjustment circuit 81 outputs the low control signal D2.

As has been described above, a signal output circuit configured with the PMOS transistor 130, the Zener diode 132, the NMOS transistor 122, and the second variable resistor 123 can output the voltage Vdr appropriately even if the power supply voltage Vcc drops. Thus, the switching control IC 22 can drive the power transistor 23 appropriately even if the power supply voltage Vcc drops.

===Summary===

The AC-DC converter 10 according to an embodiment of the present disclosure has been described above. The switching control IC 22 includes, for example, a signal output circuit in, for example, the level shift circuit 100. The signal output circuit includes, for example, a current generation circuit configured with the NMOS transistor 110 and the variable resistor 117. The current generation circuit operates so as to generate a current that is to flow through the Zener diode 114 provided between the power supply line L1 and the gate electrode of the PMOS transistor 111. Then, the gate-source voltage of the PMOS transistor 111 is generated based on the current flowing through the Zener diode 114. The current generation circuit increases the current upon the power supply voltage Vcc dropping below the reference voltage VREF5. This enables the current generation circuit to control the PMOS transistor 111 such that the PMOS transistor 111 can output signals appropriately by increasing the current when the power supply voltage Vcc drops.

Accordingly, it is possible to provide a signal output circuit that outputs signals appropriately even when the power supply voltage fluctuates.

Further, the current generation circuit includes, for example, the NMOS transistor 110 and the variable resistor 117. The variable resistor 117 decreases its resistance value upon the power supply voltage Vcc dropping below the reference voltage VREF5. With such a decrease in the resistance value of the variable resistor 117, the current generation circuit can increase the current, because the voltage at the source electrode of the NMOS transistor 110 becomes substantially constant when the NMOS transistor 110 is turned on.

Further, for example, the variable resistor 117 increases its resistance value upon the power supply voltage Vcc reaching the reference voltage VREF4. This enables the current generation circuit to decrease the current that is to flow through the Zener diode 114 when the power supply voltage Vcc is high. In such a case, the dynamic resistance of the Zener diode 114 may remain large, and thus the Zener diode 114 can be reduced in size.

Further, the hysteresis comparator 67 outputs a signal VLL based on the voltage level of the power supply voltage Vcc. For example, the variable resistor 117 decreases or increases its resistance value in response to this signal VLL. This enables the hysteresis comparator 67 to control the current flowing through, for example, the Zener diode 114 based on the power supply voltage Vcc.

Further, for example, the NMOS transistor 113 is provided on the ground side with respect to the PMOS transistor 111, and is turned on and off complementarily to the PMOS transistor 111. The PMOS transistor 111 outputs the signal Vn0 corresponding to the power supply voltage Vcc. This enables the PMOS transistor 111 and the NMOS transistor 113 to operate similarly to an inverter element, and output, for example, the signal Vn0 appropriately even if the switching speed of the control signal D0 is high.

Further, the control circuit 70 turns on and off, for example, the NMOS transistors 110, 113. This enables the control circuit 70 to control the gate-source voltage of the PMOS transistor 111 using, for example, the Zener diode 114 and the variable resistor 117.

Further, for example, the PMOS transistor 111 and the NMOS transistor 113 output the signal Vn0 obtained by shifting the level of the control signal D0 for turning on and off the NMOS transistor 110 to the voltage level of the power supply voltage Vcc or the ground. This enables the control signal D0 of a low voltage level to be changed into the signal Vn0 of a high voltage level.

Further, the terminal OUT is coupled to the coupling point between the PMOS transistor 130 and the NMOS transistor 131. Then, the PMOS transistor 130 and the NMOS transistor 131 output a signal corresponding to a signal IN to the terminal OUT.

Further, the control circuit 70 controls the second variable resistor 123 such that its resistance value will decrease and then increase, while the PMOS transistor 130 is on. This enables the control circuit 70 to increase the on-resistance of the PMOS transistor 130 in stages.

Further, a signal output circuit includes, for example, the PMOS transistor 111 and the NMOS transistor 110. This enables the PMOS transistor 111 to output the signal Vn0 having a voltage level corresponding to the power supply voltage Vcc, even if the control signal D0 of a low voltage level is inputted to the NMOS transistor 110.

Further, for example, the Zener diode 114 has a cathode coupled to the power supply line L1 and an anode coupled to the gate electrode of the PMOS transistor 111. This enables the Zener diode 114 to generate a gate-source voltage of the PMOS transistor 111 and protect the PMOS transistor 111.

The switching control IC 22 includes, for example, a signal output circuit in, for example, the level shift circuit 100. The signal output circuit has, for example, the current generation circuit configured with the NMOS transistor 110 and the variable resistor 117. The current generation circuit operates so as to generate a current that is to flow through the Zener diode 114 provided between the power supply line L1 and the gate electrode of the PMOS transistor 111. Then, the gate-source voltage of the PMOS transistor 111 is generated based on the current flowing through the Zener diode 114. The resistance of the current generation circuit decreases upon the power supply voltage Vcc dropping below the reference voltage VREF5. This enables the current generation circuit to control the PMOS transistor 111 such that the PMOS transistor 111 can output signals appropriately by increasing the current when the power supply voltage Vcc drops. Accordingly, it is possible to provide a signal output circuit that outputs signals appropriately even when the power supply voltage fluctuates.

Further, the current generation circuit includes, for example, the NMOS transistor 110 and the variable resistor 117. The variable resistor 117 decreases its resistance value upon the power supply voltage Vcc dropping below the reference voltage VREF5. With such a decrease in the resistance value of the variable resistor 117, the current generation circuit can increase the current, because the voltage at the source electrode of the NMOS transistor 110 becomes substantially constant when the NMOS transistor 110 is turned on.

Further, for example, the variable resistor 117 increases its resistance value upon the power supply voltage Vcc reaching the reference voltage VREF4. This enables the current generation circuit to decrease a current that is to flow through the Zener diode 114 when the power supply voltage Vcc is high. In such a case, the dynamic resistance of the Zener diode 114 may remain large, and thus the Zener diode 114 can be reduced in size.

Further, the hysteresis comparator 67 outputs a signal VLL based on the voltage level of the power supply voltage Vcc. For example, the variable resistor 117 decreases or increases its resistance value in response to this signal VLL. This enables the hysteresis comparator 67 to control the current flowing through, for example, the Zener diode 114 based on the power supply voltage Vcc.

Further, for example, the NMOS transistor 113 is provided on the ground side with respect to the PMOS transistor 111, and is turned on and off complementarily to the PMOS transistor 111. The PMOS transistor 111 outputs the signal Vn0 corresponding to the power supply voltage Vcc. This enables the PMOS transistor 111 and the NMOS transistor 113 to operate similarly to an inverter element, and output, for example, the signal Vn0 appropriately even if the switching speed of the control signal D0 is high.

Further, the control circuit 70 turns on and off, for example, the NMOS transistors 110, 113. This enables the control circuit 70 to control the gate-source voltage of the PMOS transistor 111 using, for example, the Zener diode 114 and the variable resistor 117.

Further, for example, the PMOS transistor 111 and the NMOS transistor 113 output the signal Vn0 obtained by shifting the level of the control signal D0 for turning on and off the NMOS transistor 110 to the voltage level of the power supply voltage Vcc or the ground. This enables the control signal D0 of a low voltage level to be changed into the signal Vn0 of a high voltage level.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

It is possible to provide a signal output circuit that outputs signals appropriately even when the power supply voltage fluctuates.

What is claimed is:

1. A signal output circuit comprising:
   a first transistor coupled to a power supply line to receive a power supply voltage;
   a diode provided between the power supply line and a gate electrode of the first transistor; and
   a current generation circuit provided on a side of a ground with respect to the diode, the current generation circuit being configured to
      generate a current for the diode, upon turning on of the first transistor, and
      increase the current, upon the power supply voltage dropping below a first level.

2. The signal output circuit according to claim 1, wherein the current generation circuit includes
   a second transistor configured to be turned on, upon turning on of the first transistor, and
   a variable resistor provided between the second transistor and the ground, the variable resistor being configured to decrease a resistance value thereof, upon the power supply voltage dropping below the first level.

3. The signal output circuit according to claim 2, wherein the variable resistor increases the resistance value, upon the power supply voltage reaching a second level that is higher than the first level.

4. The signal output circuit according to claim 3, further comprising a first control circuit configured to control the variable resistor such that the resistance value decreases upon the power supply voltage dropping below the first level, and increases upon the power supply voltage exceeding the second level.

5. The signal output circuit according to claim 2, wherein
   a third transistor is provided on the side of the ground with respect to the first transistor, the third transistor being configured to be turned on and off complementarily to the first transistor, and
   the first transistor outputs a signal corresponding to the power supply voltage, upon turning on of the first transistor.

6. The signal output circuit according to claim 5, further comprising a second control circuit configured to turn on and off the second and third transistors.

7. The signal output circuit according to claim 6, wherein the first and third transistors output the signal obtained by shifting a level of a control signal for turning on and off the second transistor.

8. The signal output circuit according to claim 6, further comprising an output terminal to which the first transistor and the third transistor are coupled, wherein
   the first and third transistors output the signal to the output terminal.

9. The signal output circuit according to claim 8, wherein the second control circuit controls the variable resistor such that the resistance value decreases and then increases while the first transistor is on.

10. The signal output circuit according to claim 2, wherein
    the first transistor is a P-channel metal-oxide-semiconductor (PMOS) transistor, and
    the second transistor is an N-channel metal-oxide-semiconductor (NMOS) transistor.

11. The signal output circuit according to claim 1, wherein the diode is a Zener diode having a cathode coupled to the power supply line and an anode coupled to the gate electrode of the first transistor.

12. A power supply circuit configured to generate a direct-current voltage from an alternating-current voltage, the power supply circuit comprising:
    an inductor to receive a rectified voltage corresponding to the alternating-current voltage;
    a power transistor configured to control an inductor current flowing through the inductor; and
    an integrated circuit configured to drive the power transistor,
    the integrated circuit including
       a first transistor coupled to a power supply line to receive a power supply voltage,
       a diode provided between the power supply line and a gate electrode of the first transistor, and
       a current generation circuit provided on a side of a ground with respect to the diode, the current generation circuit being configured to
          generate a current for the diode, upon turning on of the first transistor, and
          increase the current, upon the power supply voltage dropping below a first level.

13. A signal output circuit comprising:
    a first transistor coupled to a power supply line to receive a power supply voltage;
    a diode provided between the power supply line and a gate electrode of the first transistor; and
    a current generation circuit provided on a side of a ground with respect to the diode, the current generation circuit being configured to generate a current for the diode upon turning on of the first transistor, wherein
    the current generation circuit, through which the current flows upon turning on of the first transistor, has a resistance value that decreases upon the power supply voltage dropping below a first level.

14. The signal output circuit according to claim 13, wherein the current generation circuit includes
    a second transistor configured to be turned on, upon turning on of the first transistor, and
    a variable resistor provided between the second transistor and the ground, the variable resistor being configured to decrease the resistance value, upon the power supply voltage dropping below the first level.

15. The signal output circuit according to claim 14, wherein
    the variable resistor increases the resistance value, upon the power supply voltage reaching a second level that is higher than the first level.

16. The signal output circuit according to claim 15, further comprising a first control circuit configured to control the variable resistor such that the resistance value decreases upon the power supply voltage dropping below the first level, and increases upon the power supply voltage exceeding the second level.

17. The signal output circuit according to claim 14, wherein
    a third transistor is provided on the side of the ground with respect to the first transistor, the third transistor being configured to be turned on and off complementarily to the first transistor, and the first transistor outputs a signal corresponding to the power supply voltage, upon turning on of the first transistor.

18. The signal output circuit according to claim 17, further comprising a second control circuit configured to turn on and off the second and third transistors.

19. The signal output circuit according to claim 18, wherein
the first and third transistors output the signal obtained by shifting a level of a control signal for turning on and off the second transistor.

* * * * *